United States Patent
Priyanto et al.

(10) Patent No.: US 11,076,377 B2
(45) Date of Patent: *Jul. 27, 2021

(54) POSITIONING OF MOBILE DEVICES

(71) Applicant: Sony Corporation, Tokyo (JP)

(72) Inventors: Basuki Priyanto, Lund (SE); Shin Horng Wong, Weybridge (GB); Martin Beale, Weybridge (GB)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,680

(22) Filed: May 13, 2020

(65) Prior Publication Data

US 2020/0275401 A1 Aug. 27, 2020

Related U.S. Application Data

(63) Continuation of application No. 16/323,709, filed as application No. PCT/EP2016/069130 on Aug. 11, 2016, now Pat. No. 10,681,669.

(51) Int. Cl.
*H04W 64/00* (2009.01)
*G01S 1/04* (2006.01)
(Continued)

(52) U.S. Cl.
CPC ........... *H04W 64/003* (2013.01); *G01S 1/042* (2013.01); *G01S 1/0428* (2019.08); *G01S 1/20* (2013.01);
(Continued)

(58) Field of Classification Search
CPC ... H04W 64/003; H04W 64/00; G01S 1/0428; G01S 1/042; G01S 1/20; G01S 5/0036;
(Continued)

(56) References Cited

U.S. PATENT DOCUMENTS

2010/0317343 A1* 12/2010 Krishnamurthy ..... G01S 5/0236
455/435.1
2011/0081933 A1* 4/2011 Suh ....................... G01S 5/0236
455/509
(Continued)

FOREIGN PATENT DOCUMENTS

JP 2012525724 A 10/2012
JP 2014502067 A 1/2014
(Continued)

OTHER PUBLICATIONS

International Search Report and Written Opinion from counterpart International Patent Application No. PCT/EP2016/069130 dated Apr. 18, 2017, 12 pages.
(Continued)

*Primary Examiner* — Farid Seyedvosoghi
(74) *Attorney, Agent, or Firm* — Tucker Ellis LLP

(57) ABSTRACT

A base station transmits, in a repetitive first sequence of transmission frames of a wireless channel, first positioning reference signals. The base station transmits, in a repetitive second sequence of transmission frames of the wireless channel, second positioning reference signals. The first positioning reference signals and the second positioning reference signals each facilitate determining a time of arrival of signals communicated on the wireless channel.

18 Claims, 18 Drawing Sheets

---

6001
In a repetitive first sequence of transmission frames:
transmit first positioning reference signals

6002
In a repetitive second sequence of transmission frames:
transmit second positioning reference signals

(51) Int. Cl.
*G01S 1/20* (2006.01)
*G01S 5/00* (2006.01)
*G01S 11/08* (2006.01)
*H04L 5/00* (2006.01)
*H04W 4/02* (2018.01)

(52) U.S. Cl.
CPC ............ *G01S 5/0036* (2013.01); *G01S 11/08* (2013.01); *H04L 5/0048* (2013.01); *H04W 4/02* (2013.01); *H04W 64/00* (2013.01)

(58) Field of Classification Search
CPC ... G01S 5/0226; G01S 11/08; G01S 2205/008
USPC ...................................................... 455/456.1
See application file for complete search history.

(56) References Cited

U.S. PATENT DOCUMENTS

| | | | |
|---|---|---|---|
| 2012/0040696 A1 | 2/2012 | Siomina | |
| 2012/0195286 A1 | 8/2012 | Kim | |
| 2014/0112261 A1 | 4/2014 | Chen | |
| 2015/0215729 A1* | 7/2015 | Opshaug | G01S 5/0215 |
| | | | 455/456.1 |
| 2016/0050534 A1* | 2/2016 | Lim | G01S 5/0236 |
| | | | 370/252 |
| 2018/0035251 A1* | 2/2018 | Bitra | H04L 5/0048 |
| 2019/0007923 A1* | 1/2019 | Blankenship | H04W 24/10 |

FOREIGN PATENT DOCUMENTS

| | | |
|---|---|---|
| JP | 2014504369 A | 2/2014 |
| WO | 2010124448 A1 | 11/2010 |
| WO | 2012081861 A2 | 6/2012 |
| WO | 2015199392 A1 | 12/2015 |

OTHER PUBLICATIONS

International Search Report and Written Opinion from counterpart International Patent Application No. PCT/EP2016/069129 dated May 30, 2017, 12 pages.
3GPP; Technical Specification Group Radio Access Network; Evolved Universal Terrestrial Radio Access; Physical channels and modulation; Technical Specification: 36.211, V13.2.0 (Jun. 2016), Chapter 6.10.4; 4 pages.
3GPP; Technical Specification Group Radio Access Network; Evolved Universal Terrestrial Radio Access; LTE Positioning Protocol; Technical Specification: 36.355, V13.1.0 (Mar. 2016), Chapter 6.5.1; 11 pages.
3GPP; Technical Specification Group Radio Access Network; Evolved Universal Terrestrial Radio Access; LTE Positioning Protocol A; Technical Specification: 36.455, V13.1.0 (Mar. 2016), Chapter 8.2.5; 3 pages.
Decision to Grant from corresponding Japanese Application No. 2019-507236 dated Feb. 2, 2021.

* cited by examiner

FIG. 20

| | 6021 |
|---|---|
| Communicate at laest one control message to base station and/or device | |

…

POSITIONING OF MOBILE DEVICES

CROSS-REFERENCE TO RELATED APPLICATION

This application is a continuation application claiming the benefit of U.S. patent application Ser. No. 16/323,709, filed Feb. 6, 2019, which is a national stage application of International Application No. PCT/EP2016/069130, filed Aug. 11, 2016, the disclosures of which are incorporated herein by reference in their entireties.

TECHNICAL FIELD

Various examples relate to positioning of mobile devices. In particular, various examples relate to positioning of mobile devices based on communication of positioning reference signals via a wireless channel comprising transmission frames.

BACKGROUND

Positioning techniques for mobile devices are applied in various fields of technology. Sometimes, positioning techniques are combined with wireless communication. In this context, a particular technique is the Observed Time Difference Of Arrival (OTDOA). Here, downlink (DL) positioning reference signals are transmitted by a plurality of base stations and received by a mobile device. The mobile device can then determine the time-difference of arrival (TDOA), sometimes also referred to as Reference Signal Time Difference (RSTD). The TDOA can thus correspond to the observed time difference between the positioning reference signals received from a target base station and the reference base station. In some examples, it is possible that the mobile device determines the TDOA for two or more base stations: this then typically involves three or more base stations, because one base station is used as the reference.

Then, based on the TDOA, location information for the mobile device can be calculated. The location information may be indicative of the position of the mobile device. For determining the location information, the predefined locations of the base stations involved and/or predefined time offsets between the involved base stations can be considered. In some examples, a location server may determine the location information based on triangulation. OTDOA techniques are described in the Third Generation Partnership Project (3GPP) Technical Specification (TS) 36.211 V13.2.0 (2016-06), chapter 6.10.4., TS 36.355 V13.1.0 (2016-03) chapter 6.5.1., as well as TS 36.455 V13.1.0 (2016-03) chapter 8.2.5.

However, such OTDOA positioning techniques according to reference implementations face certain drawbacks and restrictions. For example, the accuracy of such positioning techniques may be limited. For example, the energy consumption for receiving and processing the positioning reference signals can be significant.

SUMMARY

Therefore, a need exists for advanced positioning techniques for mobile devices. In particular, a need exists for such techniques which overcome or mitigate at least some of the above identified drawbacks and restrictions.

According to an example, a base station includes an interface. The interface is configured to communicate on a wireless channel. The base station further includes at least one processor. The at least one processor is configured to transmit first positioning reference signals. The first positioning reference signals are transmitted in a repetitive first sequence of transmission frames of the wireless channel. The base station is further configured to transmit second positioning reference signals. The second positioning reference signals are transmitted in a repetitive second sequence of transmission frames of the wireless channel. The second sequence is at least partly different from the first sequence. The first positioning reference signals and the second positioning reference signals each facilitate determining a time of arrival of signals communicated on the wireless channel.

According to an example, a device includes an interface. The interface is configured to communicate on a wireless channel. The device further includes at least one processor. The at least one processor is configured to select between a repetitive first sequence of transmission frames of the wireless channel and a repetitive second sequence of transmission frames of the wireless channel. The at least one processor is further configured to selectively receive first positioning reference signals in the first sequence or second positioning reference signals in the second sequence depending on said selecting. The at least one processor is further configured to determine a time of arrival of signals communicated on the wireless channel selectively based on the first positioning reference signals or the second positioning reference signals depending on said selecting.

According to an example, a network node includes an interface. The interface is configured to communicate with at least one of a plurality of base stations and a device. The network node further includes at least one processor. The at least one processor is configured to communicate a control message to at least one of a given one of the plurality of base stations and the device. The at least one control message is indicative of a repetitive first sequence of transmission frames of a wireless channel in which the given base station is to transmit first positioning reference signals to the device. The at least one control message is further indicative of a repetitive second sequence of transmission frames of the wireless channel in which the given base station is to transmit second positioning reference signals to the device. The first positioning reference signals and the second positioning reference signals each facilitate determining of a time of arrival of signals communicated on the wireless channel.

According to an example, a method includes transmitting first positioning reference signals in a repetitive first sequence of transmission frames of a wireless channel. The method further includes transmitting second positioning reference signals in a repetitive second sequence of transmission frames of the wireless channel. The second sequence is at least partly different from the first sequence. The first positioning reference signals and the second positioning reference signals each facilitate determining a time of arrival of signals communicated on the wireless channel.

According to an example, a computer program product includes program code. The program code can be executed by at least one processor. Executing the program code by the at least one processor causes the at least one processor to perform a method. The method includes transmitting first positioning reference signals in a repetitive first sequence of transmission frames of a wireless channel. The method further includes transmitting second positioning reference signals in a repetitive second sequence of transmission frames of the wireless channel. The second sequence is at least partly different from the first sequence. The first positioning reference signals and the second positioning reference signals each facilitate determining a time of arrival of signals communicated on the wireless channel.

According to an example, a computer program includes program code. The program code can be executed by at least one processor. Executing the program code by the at least one processor causes the at least one processor to perform a method. The method includes transmitting first positioning reference signals in a repetitive first sequence of transmission frames of a wireless channel. The method further includes transmitting second positioning reference signals in a repetitive second sequence of transmission frames of the wireless channel. The second sequence is at least partly different from the first sequence. The first positioning reference signals and the second positioning reference signals each facilitate determining a time of arrival of signals communicated on the wireless channel.

According to an example, a method includes selecting between a repetitive first sequence of transmission frames of a wireless channel and a repetitive second sequence of transmission frames of the wireless channel. The method further includes selectively receiving first positioning reference signals in the first sequence or second positioning reference signals in the second sequence, depending on said selecting. The method further includes determining a time of arrival of signals communicated on the wireless channel depending on said selecting. Said determining is selectively based on the first positioning reference signals or the second positioning reference signals.

According to an example, a computer program product includes program code. The program code can be executed by at least one processor. Executing the program code by the at least one processor causes the at least one processor to perform a method. The method includes selecting between a repetitive first sequence of transmission frames of a wireless channel and a repetitive second sequence of transmission frames of the wireless channel. The method further includes selectively receiving first positioning reference signals in the first sequence or second positioning reference signals in the second sequence, depending on said selecting. The method further includes determining a time of arrival of signals communicated on the wireless channel depending on said selecting. Said determining is selectively based on the first positioning reference signals or the second positioning reference signals.

According to an example, a computer program includes program code. The program code can be executed by at least one processor. Executing the program code by the at least one processor causes the at least one processor to perform a method. The method includes selecting between a repetitive first sequence of transmission frames of a wireless channel and a repetitive second sequence of transmission frames of the wireless channel. The method further includes selectively receiving first positioning reference signals in the first sequence or second positioning reference signals in the second sequence, depending on said selecting. The method further includes determining a time of arrival of signals communicated on the wireless channel depending on said selecting. Said determining is selectively based on the first positioning reference signals or the second positioning reference signals.

According to an example, a method includes communicating at least one control message to at least one of a base station and a device. The at least one control message is indicative of a repetitive first sequence of transmission frames of a wireless channel in which the base station is to transmit first positioning reference signals to the device. The at least one control message is further indicative of a repetitive second sequence of transmission frames of the wireless channel in which the base station is to transmit second positioning reference signals to the device. The first positioning reference signals and the second positioning reference signals each facilitate determining a time of arrival of signals communicated on the wireless channel.

According to an example, a computer program product includes program code. The program code can be executed by at least one processor. Executing the program code by the at least one processor causes the at least one processor to perform a method. The method includes communicating at least one control message to at least one of a base station and a device. The at least one control message is indicative of a repetitive first sequence of transmission frames of a wireless channel in which the base station is to transmit first positioning reference signals to the device. The at least one control message is further indicative of a repetitive second sequence of transmission frames of the wireless channel in which the base station is to transmit second positioning reference signals to the device. The first positioning reference signals and the second positioning reference signals each facilitate determining a time of arrival of signals communicated on the wireless channel.

According to an example, a computer program includes program code. The program code can be executed by at least one processor. Executing the program code by the at least one processor causes the at least one processor to perform a method. The method includes communicating at least one control message to at least one of a base station and a device. The at least one control message is indicative of a repetitive first sequence of transmission frames of a wireless channel in which the base station is to transmit first positioning reference signals to the device. The at least one control message is further indicative of a repetitive second sequence of transmission frames of the wireless channel in which the base station is to transmit second positioning reference signals to the device. The first positioning reference signals and the second positioning reference signals each facilitate determining a time of arrival of signals communicated on the wireless channel.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 20 is a flowchart of a method according to various embodiments.

DETAILED DESCRIPTION OF EMBODIMENTS

Figure 1:
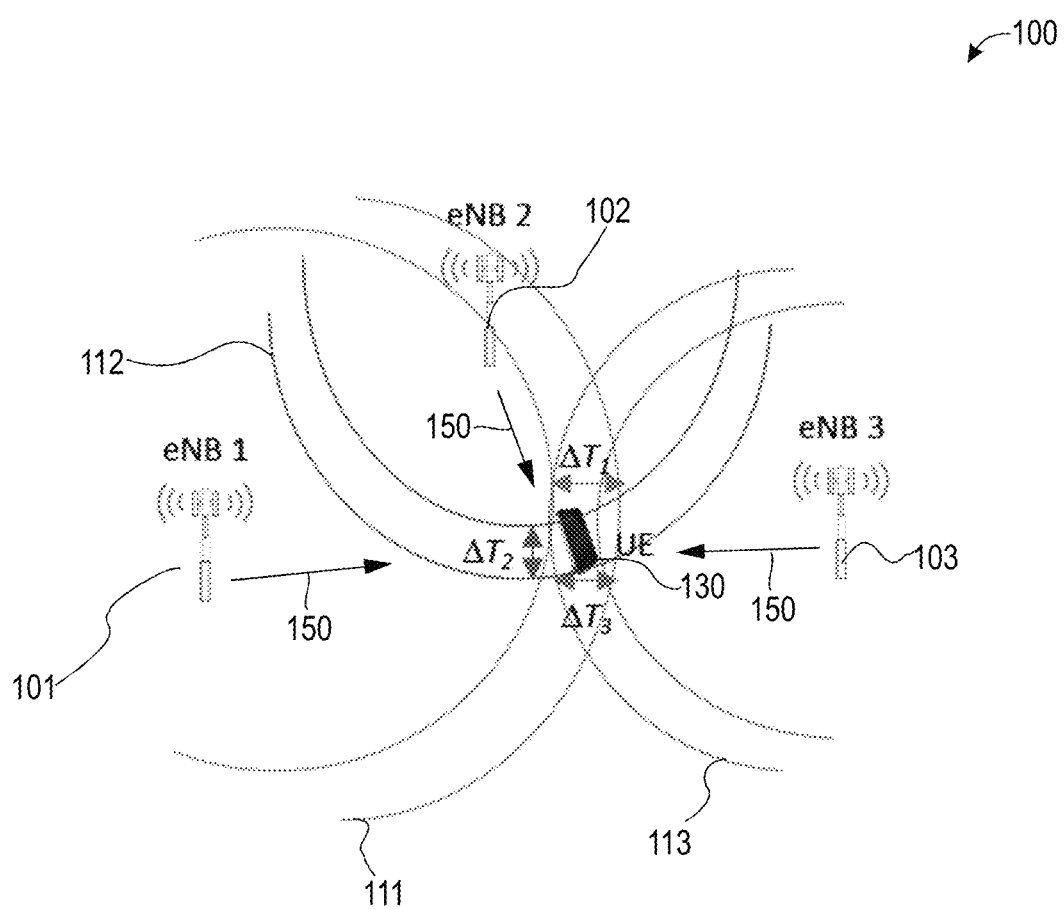
FIG. 1 schematically illustrates communication of DL positioning reference signals from a plurality of base stations of a cellular network to a mobile device according to various embodiments.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, positioning techniques for mobile devices are described. The positioning techniques rely on the communication of positioning reference signals. In some examples, DL positioning reference signals are transmitted by one or more base stations (BSs) and received by a mobile device. While hereinafter the various examples are primarily described in the context of DL positioning reference signals, generally, such techniques may also be applied to uplink (UL) positioning reference signals.

The positioning techniques generally enable to track the position of the mobile device over the course of time. For this, location data indicative of the position of the mobile device may be determined. Based on the location data of the mobile device, position-dependent services can be implemented. Examples include geo-messaging, geo-tracking, etc.

In some examples, the positioning techniques described herein may be applied in the Internet of Things (IoT) framework. For example, this may correspond to the 3GPP Enhanced Machine-type Communication (eMTC) or the 3GPP Narrowband Internet of Things (NB-IoT) technology: These examples are described in 3GPP RP-161321 "New work item proposal on further enhanced MTC", Ericsson, RAN #72, and RP-161324 "New work item proposal: enhancements of NB-IOT", Vodafone, Huawei, HiSilicon, Ericsson, Qualcomm, RAN #72, respectively. Such techniques in the IoT framework typically aim at creating low-cost mobile devices that are power efficient and can operate in extended coverage, e.g., such as inside basements.

FIG. 1 illustrates aspects with respect to positioning techniques according to various examples. In particular, FIG. 1 illustrates aspects with respect to positioning techniques which rely on communication of DL positioning reference signals 150.

FIG. 1 illustrates the architecture of a cellular network 100 according to some examples implementations. In particular, the cellular network 100 according to the example of FIG. 1 implements the 3GPP LTE architecture. According to 3GPP LTE, a wireless channel is defined according to the evolved UMTS Terrestrial Radio Access (EUTRAN). Such illustration in the 3GPP LTE framework is for exemplary purposes only. Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC systems and 3GPP New Radio (NR) positioning. Furthermore, respective techniques may be readily applied to various kinds of non-3GPP-specified architectures, such as Bluetooth, satellite communication, IEEE 802.11x Wi-Fi technology, etc.

In FIG. 1, a mobile device 130 (labeled UE in FIG. 1) can receive DL positioning reference signals 150 transmitted by each one of a plurality of BSs 101-103. In the 3GPP LTE architecture, the BSs 101-103 are implemented as evolved Node B's (eNBs). The positioning reference signals 150 transmitted by different BSs 101-103 may be orthogonal with respect to each other, e.g., in time-domain, frequency-domain, and/or code-domain. This mitigates interference.

To facilitate positioning of the mobile device 130, the mobile device 130 is typically time-synchronized with one or more of the BSs 101-103. E.g., the BSs 101-13 can be time-synchronized with one another; the serving BS 101-103 can be time-synchronized with the mobile device 130. Optionally, the BSs 101-103 are also time-synchronized with respect to each other.

The mobile device 130 may be one of the following: a smartphone; a cellular phone; a table; a notebook; a computer; a smart TV; a MTC device; an eMTC device; an IoT device; an NB-IoT device; etc.

FIG. 1 illustrates aspects with respect to the accuracy of determining the location of the mobile device 130. Typically, the accuracy of determining the location of the mobile device 130 depends on the accuracy of the measured positioning reference signals 150. For example, in FIG. 1, the determination of the time of arrival (TOA) 111 of the DL positioning reference signals 150 transmitted by the BS 101 has an accuracy of $\Delta T1$; the determination of the TOA 112 of the DL positioning reference signals 150 transmitted by the BS 102 has an accuracy of $\Delta T2$; and the determination of the TOA 113 of the DL positioning reference signals 150 transmitted by the BS 103 has an accuracy of $\Delta T3$. Typically, the accuracy of the TOA 111-113 measurements depends on the quality of the measured DL positioning reference signal and a bandwidth of the DL positioning reference signal.

Positioning reference signals may generally correspond to well-defined symbols transmitted via the wireless channel. The positioning reference signals may be encoded according to predefined rules. The positioning reference signals may have a well-defined amplitude and/or symbol value. Based on such well-defined properties of the positioning reference signals, it is possible to determine the TOA of the positioning reference signals. Various examples of positioning reference signals are conceivable. For example, in some examples, the positioning reference signals may be encoded based on a certain sequence code. In some examples, the sequence code may have a dependency on the time-frequency position of the particular resource used for transmission of the positioning reference signal 150 via the wireless channel. In some examples, the sequence code may have a dependency on an identity of the transmitting BS, e.g., a cell identifier (cell ID). Thereby, the positioning reference signals 150 may be indicative of the respective BSs. In some examples, the sequence code may have a dependency on the transmission frame which includes the resource allocated for transmission of the respective positioning reference signal 150: e.g., this may result in positioning reference signals 150 communicated in different transmission frames to be encoded differently. Thereby, the positioning reference signals may be indicative of the respective transmission frames. In some examples, the positioning reference signals may be scheduled specifically for a given mobile device 130. Different mobile devices may be associated with different positioning reference signals at different positioning occasions.

In some examples, the positioning reference signals employed according to the various examples described herein may employ the sequence code according to 3GPP TS 36.211 V13.2.0 (2016-06), 6.10.4.1. In some examples, the positioning reference signals are employed according to the various examples described herein may employ the sequence code according to 3GPP TS 36.211 V13.2.0 (2016-06), 6.10.10.1. In some examples, the positioning reference signals are employed according to the various examples described herein may employ the sequence code according to 3GPP TS 36.211 V13.2.0 (2016-06), 6.11.2.1. In some examples, the positioning reference signals are employed according to the various examples described herein may employ the sequence code according to 3GPP TS 36.211 V13.2.0 (2016-06), 6.11.1.1.

Figure 2:
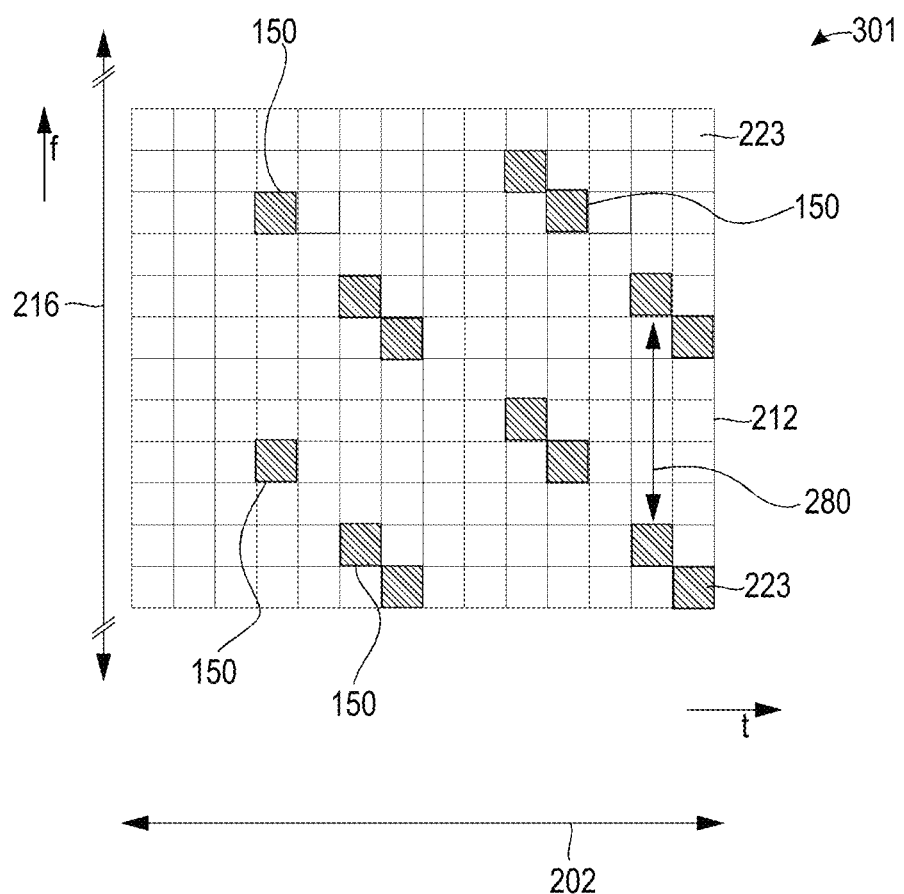
FIG. 2 schematically illustrates a resource mapping of a subframe of a wireless channel comprising a plurality of resources allocated for transmission of DL positioning reference signals according to various embodiments.

FIG. 2 illustrates aspects with respect to a resource mapping 301 of the wireless channel. FIG. 2 illustrates a resource mapping 301 used for transmission of DL positioning reference signals 150 from a given BS 101-103 to the mobile device 130.

The resource mapping 301 includes a plurality of time-frequency resources 223. The various resources 223 can be orthogonal with respect to each other. In an example, a resource 223 may relate to a symbol encoded by a Orthogonal Frequency Division Multiplexing (OFDM) subcarrier. Sometimes, a resource 223 may be referred to as a resource element. Each resource 223 may include a cyclic prefix.

The resource mapping 301 further defines some of the resources 223 to be allocated for transmission of the DL positioning reference signals 150 (in FIG. 2, the respective resources 223 are illustrated with the dashed filling). Other resources 223 are not allocated for transmission of the DL positioning reference signals 150: such resources 223 may be allocated for transmission of control data, payload data, other reference signals, etc. In some examples, it is also possible that resources 223 in the vicinity of positioning reference signals 150 do not carry data to mitigate interference. For example, other resources 223 may be used by other BSs for transmission of DL positioning reference signals 150.

The position of the respective resources 223 allocated for communication of a positioning reference signal 150 may be defined with respect to a subframe 202. The subframe 202 is a particular implementation of the transmission frame of the wireless channel. In other examples, the position of the respective resource 223 allocated to communication of a positioning reference signal 150 may, alternatively or additionally, be defined with respect to a frame comprising a plurality of subframes 202 and/or with respect to the time slot being part of a subframe. In an example implementation, the duration of the subframe 202 may be 1 millisecond. The subframe 202 may include two time slots, each of 0.5 milliseconds duration. The frame may include a plurality of subframes 202, e.g., a count of ten subframes 202.

In the example of FIG. 2, the position of the respective resource 223 allocated to the communication of the positioning reference signal 150 is, furthermore, defined with respect to a resource block 212. The resource block 212 includes a plurality of resources 223. Typically, the bandwidth of the wireless channel includes a plurality of resource blocks 212, e.g., two resource blocks, ten resource blocks, fifty resource blocks, or even hundred resource blocks (in FIG. 2, for sake of simplicity, only the single resource block 212 is illustrated).

To mitigate inter-BS interference, it is possible that the particular resources 223 allocated for communication of the positioning reference signals 150 are varied from BS 101-103 to BS 101-103. Thus, different BSs 101-103 may employ different resource mappings (in FIG. 2 only a single resource mapping 301 is shown for simplicity). In one example, each resource mapping 101-103 including resources 223 allocated for transmission of the positioning reference signals 150 may be uniquely allocated to a BS 101-103. For example, the particular resources 223 allocated for communication of the positioning reference signals 150 may depend on a unique identity associated with the transmitting BS 101-103, e.g., the cell ID.

To further reduce the inter-BS interference, certain BSs 101-103 may be configured to alternatingly mute transmission of the positioning reference signals 150 in a time-division multiplexing (TDM) manner. Thus, such techniques enable time-division multiplexing and/or frequency-division (FDM) multiplexing. Alternatively or additionally, it would also be possible to employ code-division multiplexing (CDM) between the plurality of BSs 101-103 transmitting the positioning reference signals. Here, scrambling code can be employed.

To mitigate intra-BS interference and/or inter-BS interference, it is possible that a particular subframe 202 including resources 223 allocated for transmission of the positioning reference signals 150 is a protected subframe 202. For example, the protected subframe 202 may not include resources 223 allocated for transmission of payload data.

Payload data may be data originating from a higher layer of the transmission protocol stack. For example, payload data may be data originating from the application layer according to the OSI model of the transmission protocol stack. Sometimes, payload data is also referred to as user data.

Typically, a higher accuracy may be achieved for determining the position of the mobile device 130 if a larger count of positioning reference signals 150 is communicated from each participating BS 101-103 to the mobile device 130. This is why a plurality of resources 223 are allocated for transmission of the positioning reference signals 150 per subframe 202. For example, the count of resources 223 allocated for transmission of the positioning reference signals 150 with respect to the total count of resources 223 in the subframe 202 may define a time-frequency density of the positioning reference signals 150. The time-frequency density may be defined with respect to a resource block 212 and/or may be defined with respect to the system bandwidth of the wireless channel. Typically, a higher time-frequency density of the positioning reference signals 150 results in a higher accuracy for determining the position of the mobile device 130.

In FIG. 2, a frequency offset 280 between simultaneously communicated positioning reference signals 150 is illustrated. Often, a smaller frequency offset 280 will result in a higher time-frequency density of the positioning reference signals 150.

Figure 3:
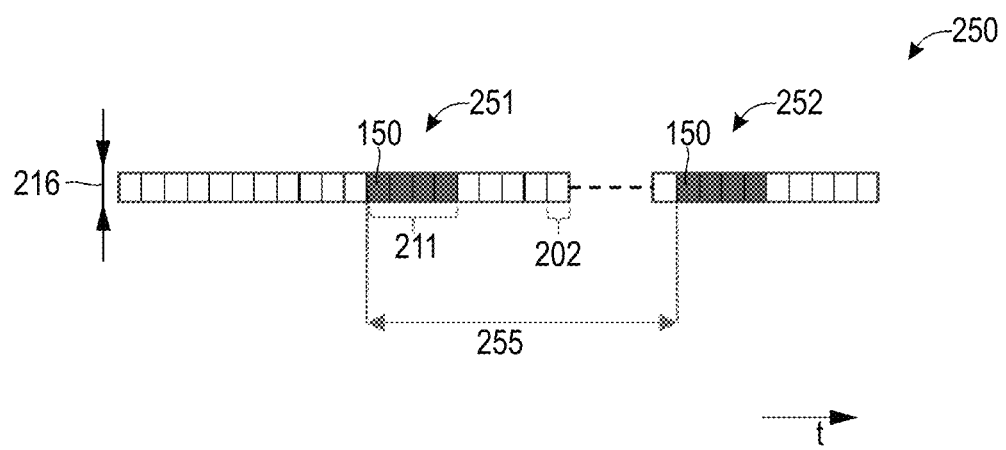
FIG. 3 schematically illustrates a sequence of subframes of the wireless channel comprising a plurality of resources allocated for transmission of DL positioning reference signals, wherein the sequences is repeated according to a timing schedule according to various embodiments.

FIG. 3 schematically illustrates aspects with respect to a repetitive timing schedule 250. The repetitive timing schedule 250 is used for transmission of DL positioning reference signals 150 from a given BS 101-103 to the mobile device 130. Other BSs 101-103 may use the same or different repetitive timing schedule 250. Properties of the repetitive timing schedule 250 may be configured by the network 100 using control signaling, e.g., Radio Resource Control (RRC) signaling and/or Non-Access Stratum (NAS) in the example of 3GPP LTE systems. Alternatively or additionally, properties of the timing schedule 250 may be signaled explicitly or implicitly using OTDOA parameters. For example, the LTE positioning protocol (LPP) as specified in 3GPP TS 36.355 may be used to signal the timing schedule 250. Generally, the OTDOA parameters and/or the timing schedule 250 may be communicated between a server such as a location server and the terminal and/or between the server and the BSs 101-103.

According to the repetitive timing schedule 250, a sequence 211 of subframes 202 is repeatedly transmitted. The sequence 211 includes a plurality of subframes 202 adjacent in time-domain to each other: thus, the sequence is contiguous. Each one of the subframes 202 of the sequence 211 includes at least one positioning reference signal 150 (in FIG. 3, the subframes 202 of the sequence 211 are illustrated with the dark filling). For example, there may be no subframes 202 within the sequence 211 which do not include at least one positioning reference signal 150.

Each subframe 202 of the sequence 211 includes one or more resources 223 being allocated for transmission of positioning reference signals 150. For example, in the scenario of FIG. 3, each one of the four subframes 202 of the sequence 211 may be configured according to the resource mapping 301 is illustrated in FIG. 2.

In the example of FIG. 3, a first repetition 251 of the sequence 211 and a second repetition 252 of the sequence 211 are illustrated. There may be more than two repetitions 251, 252. E.g., the sequence 211 may be repeated infinitely.

For example, the sequence 211 may be repeatedly communicated at a given repetition rate. In some examples, the repetition rate may be periodic. In FIG. 3, a periodicity 255 with which the sequence 211 is repeated is illustrated.

In FIGS. 2 and 3, a bandwidth 216 used for transmission of the positioning reference signals 150 is illustrated. In the example of FIGS. 2 and 3, the bandwidth 216 used for the transmission of the positioning reference signals 150 equals the entire system bandwidth of the wireless channel. In other examples, the bandwidth 216 may cover less than the entire system bandwidth. For example, according to reference implementations of a 3GPP LTE 20 MHz system, the bandwidth 216 may be. Hence, in some examples, resources 223 of the resource mapping 301 may be allocated for transmission of the positioning reference signals 150 across the entire band width of the wireless channel or a subfraction thereof; in some examples of the techniques described herein, it is possible that the bandwidth 216 used for transmission of the positioning reference signals 150 is smaller than the entire bandwidth of the wireless channel.

If the bandwidth 216 used for transmission of the positioning reference signals 150 is smaller than the entire bandwidth of the wireless channel, it is possible to have different arrangements of the frequency band of the positioning reference signals 150 within the frequency band of the wireless channel. In some examples, the frequency band of the positioning reference signals 150 may be centered within the frequency band of the wireless channel. In some examples, the frequency band of the positioning reference signals 150 may be arranged adjacent to an upper edge or a lower edge of the frequency band of the wireless channel. The frequency band may be defined by upper and lower limits and/or the center point and the frequency bandwidth.

Various techniques described herein are based on the finding that an accuracy of the positioning of the mobile device tends to be lower if the bandwidth 216 is restricted. For example, in the 3GPP LTE technology, the sampling rate of a symbol is dependent upon the bandwidth of the wireless channel. For example, the sampling rate for a system bandwidth of 20 MHz is 30.72 MHz: this is twice the bandwidth of a 10 MHz system bandwidth where the sampling rate is 15.36 MHz. A higher sampling rate typically result in a finer measure of the TOA and hence a more accurate determination of the distance between the respective BS 101-103 and the mobile device 130. Therefore, the accuracy is dependent on the bandwidth. For example, if the positioning reference signals 150 are transmitted using a bandwidth 216 of 1.4 MHz, an accuracy in determining the location of the mobile device 130 according to reference implementations amounts to ±150 meters. For example, if the positioning reference signals 150 are transmitted using a bandwidth 216 of 10

MHz, an accuracy in determining the location of the mobile device 130 according to reference implementations amounts to ±50 meters.

Various techniques described herein are based on the finding that for wireless channels designed for IoT applications, the system bandwidth—and with it the bandwidth 216 for transmission of the positioning reference signals 150—is typically limited. For example, according to 3GPP NB-IoT, the system bandwidth is limited to a single resource block 212 and thus amounts to 180 kHz. For example, according to 3GPP eMTC, the system bandwidth is limited to 6 resource blocks 212 and thus amounts 1.4 MHz. Various examples described herein enable increased accuracy when determining the location of a mobile device in bandwidth-limited wireless channels such as 3GPP NB-IoT and 3GPP eMTC.

Figure 4:
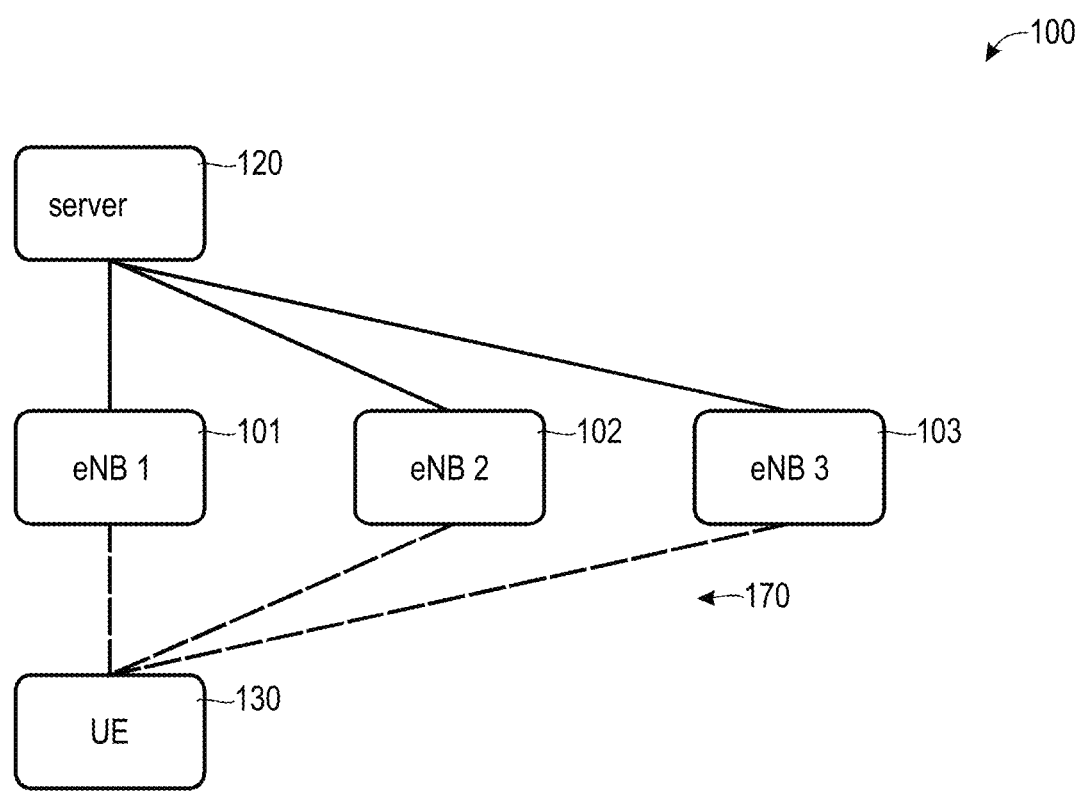
FIG. 4 schematically illustrates the architecture of a cellular network configured for positioning of a mobile device according to various embodiments.

FIG. 4 illustrates aspects with respect to the cellular network 100. In particular, FIG. 4 illustrates aspects of an architecture of the cellular network 100 for positioning the mobile device 130. As illustrated in FIG. 4, the wireless channel 170 facilitates communication between each one of the BSs 101-103 and the mobile device 130.

In FIG. 4, a network node 120 of the cellular network 100 which is implemented by a server is shown. The server 120 may perform various tasks with respect to positioning of the mobile device 130.

A first task that may be assigned to the server 120 may correspond to scheduling of the communication of the positioning reference signals 150. Here, the server 120 may implement the resource mappings specifying the resources 223 allocated for transmission of the positioning reference signals 150 at each one of the BSs 101-103. Different BSs 101-103 may thus be associated with different resource mappings: thus, different BSs 101-103 may employ different resources 223 for transmission of the positioning reference signals 150.

A second task that may be assigned to the server 120 may correspond to implementing the timing schedule for repeated transmission of the sequence 211 of subframes 202 which include the positioning reference signals 150 at each one of the BSs 101-103. Different BSs 101-103 may use different timing schedules, including different repetition rates 255 and/or lengths of the sequences 211.

A third task that may be assigned to the server 120 may correspond to determining location information based on positioning information provided by the mobile device 130. Here, it is possible that the positioning information provided by the mobile device 130 is indicative of a TDOA of the positioning reference signals 150 received from each one of the BSs 101-103 with respect to the positioning reference signals 150 received from a reference BS 101-103. Then, the server 120 can perform triangulation taking into account the positioning information, as well as predefined positions of the BSs 101-103, e.g., defined with respect to the reference BS. Based on the triangulation, the location of the mobile device 130 with respect to the BSs 101-103 may be determined. Then, the location information can be indicative of the determined position of the mobile device 130. This third task may also be executed by a separate location server (not shown in FIG. 4).

Figure 5:
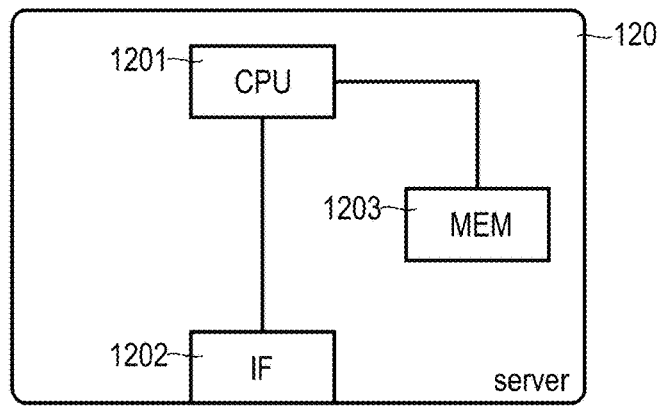
FIG. 5 schematically illustrates a server network node of the cellular network according to various embodiments.

FIG. 5 schematically illustrates aspects with respect to the server 120. The server 120 includes a processor 1201, an interface 1202, and a memory 1203. It is possible that the memory 1203 stores program code that may be executed by the processor 1201. Executing the program code can cause the processor 1201 to perform various tasks with respect to positioning of the mobile device 130. Such tasks may include the scheduling of the communication of the positioning reference signals 150, determining timing schedules for repetitive transmission of sequences of subframes including positioning reference signals 150, as well as the determining of the location information based on positioning information indicative of the TDOAs provided by the mobile device 130. The processor 1201 may exchange messages with the BSs 101-103, as well as with the mobile device 130 via the interface 1202.

Figure 6:
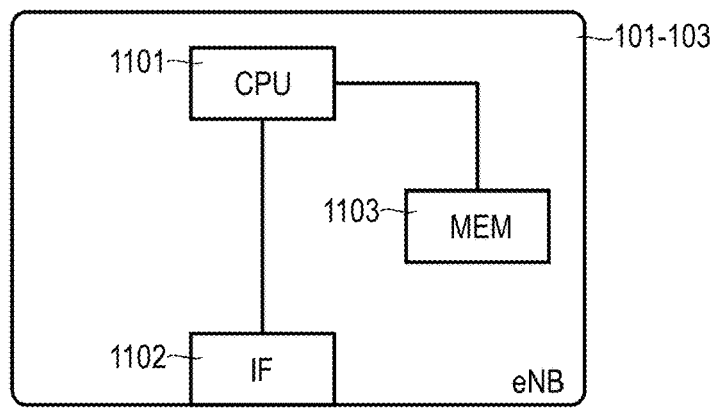
FIG. 6 schematically illustrates a base station of the cellular network according to various embodiments.

FIG. 6 schematically illustrates aspects with respect to the BSs 101-103. The BSs 101-103 each include a processor 1101, an interface 1102, and a memory 1103. It is possible that the memory 1103 stores program code that may be executed by the processor 1101. Executing the program code can cause the processor 1101 to perform various tasks with respect to positioning of the mobile device 130. Such tasks may include communicating the positioning reference signals 150 in accordance with the respective resource mapping which includes resources 223 allocated for transmission of the positioning reference signals 150. Such tasks may further include communicating the positioning reference signals 150 in the sequence 211 of subframes 202. The timing of the sequence 211 of subframes 202 may be defined by the respective timing schedule. Such tasks may further include the encoding of the positioning reference signals 150 according to a certain sequence code. The interface 1102 may be configured to transmit DL signals and receive UL signals via the wireless channel 170.

Figure 7:
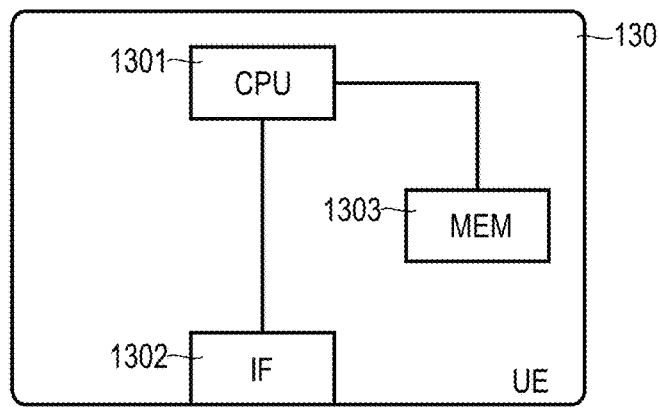
FIG. 7 schematically illustrates a mobile device of the cellular network according to various embodiments.

FIG. 7 schematically illustrates aspects with respect to the mobile device 130. The mobile device 130 includes a processor 1301, an interface 1302, and a memory 1303. It is possible that the memory 1303 stores program code that may be executed by the processor 1301. Executing the program code can cause the processor 1301 to perform various tasks with respect to positioning of the mobile device 130. Such tasks include communicating the positioning reference signals 150 in accordance with the resource mapping which includes resources 223 allocated for transmission of the positioning reference signals 150. The mobile device may receive positioning reference signals 150 from different BSs 101-101; different BSs 101-103 may use different resource mappings. Such tasks may further include communicating the positioning reference signals 150 in the sequence 211 of subframes 202. The timing of the sequence 211 of subframes 202 may be defined by the timing schedule. Again, different BSs 101-103 may use different timing schedules. Such tasks may further include decoding of the positioning reference signals 150 according to a certain sequence code. The interface 1302 may be configured to receive DL signals and transmit UL signals via the wireless channel 170.

Figure 8:
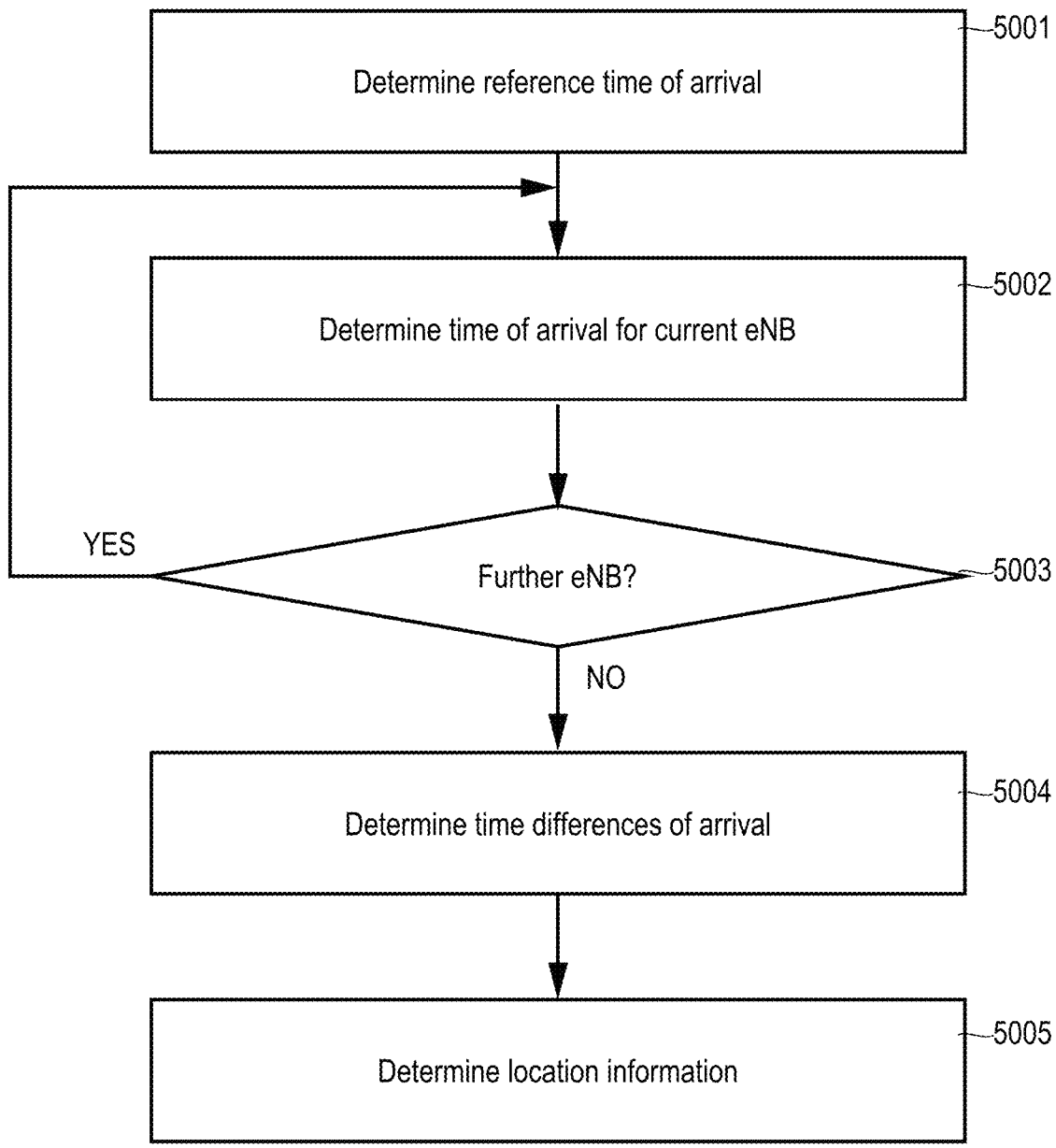
FIG. 8 is a flowchart of a method according to various embodiments.

FIG. 8 is a flowchart of a method according to various examples. The method according to FIG. 8 illustrates various aspects with respect to positioning of the mobile device 130.

First, in block 5001, the reference TOA is determined. For this, the mobile device 130 may receive one or more positioning reference signals 150 from a reference BS 101-103. Then, the mobile device 130 may determine the time-of-flight between the reference BS 101-103 transmitting the one or more positioning reference signals 150 and the mobile device 130 receiving the one or more positioning reference signals 150. From this, the TOA can be derived. Typically, determining the reference TOA is a task which requires significant computational efforts.

Next, in block 5002, the TOA is determined for a given BS 101-103 different from the reference BS 101-103. Again, the mobile device 130 may receive one or more positioning reference signals 150 from the given BS 101-103. Then, the mobile device 130 may determine the time-of-flight between the given BS 101-103 transmitting the one or more positioning reference signals 150 and the mobile device the receiving of the one or more positioning reference signals 150. Again, determining the TOA in block 5002 is a task which requires significant computational efforts.

In block 5003 it is checked whether positioning reference signals 150 are available from a further BS 101-103 different from the reference BS 101-103, as well as different from any BS 101-103 for which previously positioning reference signals in block 5002 have been received and for which previously in block 5002 the TOA has been determined.

If said checking in block 5003 yields that positioning reference signals 150 are available from a further BS 101-103, block 5002 is re-executed anew for said further BS 101-103.

Once the TOA has been determined for all available BSs 101-103 by multiple iterations of block 5002, the method commences in block 5004. In block 5004, the TDOAs are determined. For this, the reference TOA determined in block 5002 may be combined or, generally, set into relationship, with each one of the TOAs for the further BSs 101-103 determined in block 5002.

Typically, the determining of the TDOAs in block 5004 is a task which is executed by the mobile device 130, e.g., by the processor 1301. However, in other example implementations, it would also be possible that the mobile device 130 provides positioning information which is indicative of the TOAs determined in blocks 5001, 5002 to the server 120. Then, block 5004 is a task which can be executed by the server 120, e.g., by the processor 1201, or a location server.

Finally, in block 5005, the location information is determined. The location information specifies the position of the mobile device 130, e.g., in an absolute reference system such as latitude and longitude. The location information in block 5005 is typically determined based on triangulation of the TDOAs determined in block 5004.

Typically, the determining of the location information in block 5005 is a task which is executed by the server 120, e.g., by the processor 1201, or a location server. However, in other example implementations, it would also be possible that the mobile device 130 determines the location information locally.

For example, blocks 5001-5005 may be re-executed for each subframe 202 including the positioning reference signals 150. In other examples, blocks 5001-5004 may be re-executed for each repetition 251, 252 of the sequence including multiple subframes 202, each one of the multiple subframes 202 including positioning reference signals 150 from one or more of the BSs 101-103. Thereby, the location information can be up-to-date and, e.g., the position of the mobile device 130 can be tracked.

Figure 9A:
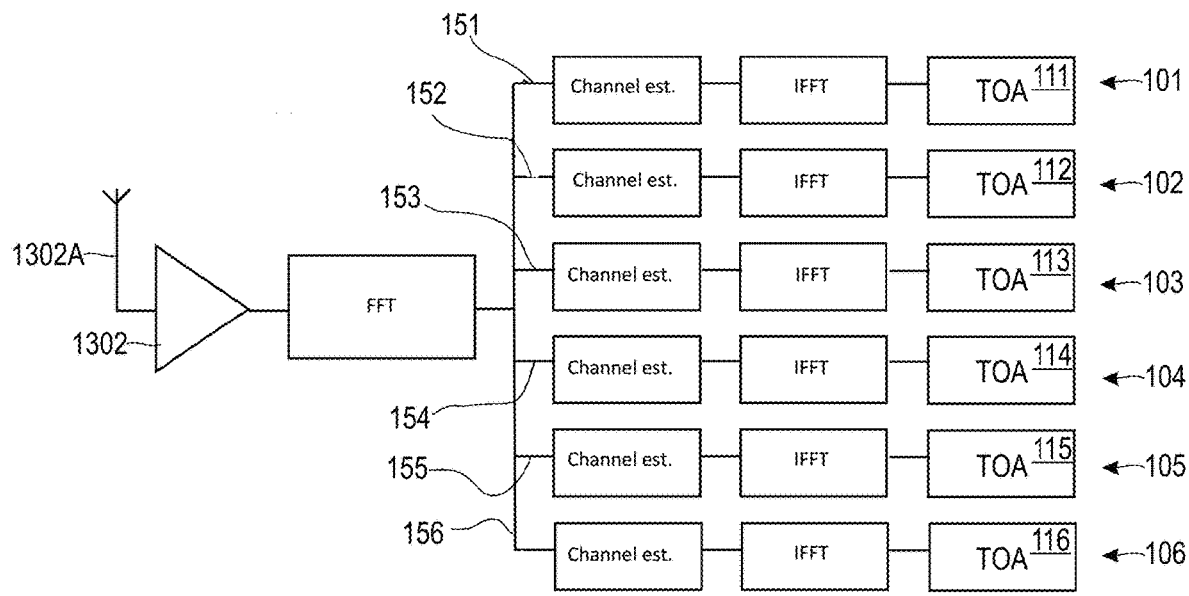
FIG. 9A schematically illustrates determining a time-difference of arrival according to various embodiments.

FIG. 9A illustrates aspects with respect to determining of TOAs 111-116 of positioning reference signals communicated on the wireless channel 170 by different BSs 101-106. In detail, FIG. 9A illustrates an example in which the TOAs 111-116 are determined by the mobile device 130.

In FIG. 9A, an antenna 1302A is coupled with the interface 1302. In the example of FIG. 9A, the interface 1302 implements an analog front end.

The analogue signals received via the wireless channel 170 by the interface 1302 are digitized and transformed into frequency domain. For this, a Fast Fourier Transform (FFT) is applied. The symbols corresponding to the different resources 223 can then be individually post-processed. For example, as illustrated in FIG. 9A, it is possible to implement different processing pipelines for the positioning reference signals 151-156 received from the different BSs 101-106. While in the example of FIG. 9A positioning reference signals 151-156 are received from a count of six BSs 101-106, in other examples, positioning reference signals may be received from a smaller or larger count of BSs.

Each of the pipelines includes a channel estimator. Following channel estimation, each pipeline converts the respective channel estimate into the time domain using an inverted FFT operation. Then, the TOA 911-916 is determined within each pipeline.

Typically, the channel estimation and the inverted FFT require significant computational efforts. For example, processing resources may be required to execute the inverted FFT. Additionally, typically, positioning reference signals 151-156 need to be buffered in the memory 1303. Typically, each received reference signal 151-156 is represented by a floating-point number. Because there may be multiple positioning reference signals 151-156 for each BS 101-106 per subframe 202, this may result in a significant usage of memory resources.

Figure 9B:
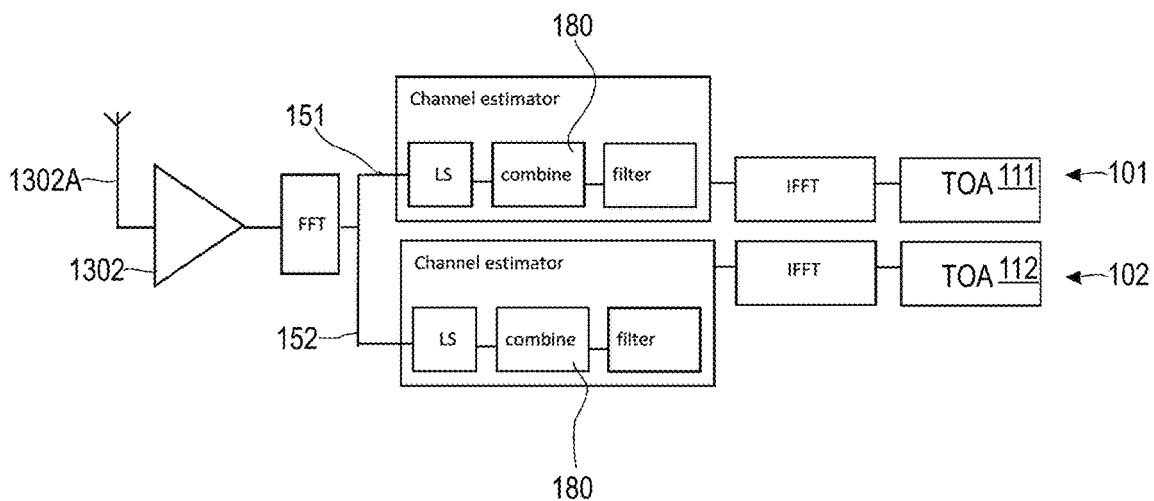
FIG. 9B schematically illustrates determining a time-difference of arrival according to various embodiments.

FIG. 9B illustrates aspects with respect to determining of TOAs 111, 112 of positioning reference signals communicated on the wireless channel 170 by different BSs 101, 102. In detail, FIG. 9B illustrates an example in which the TOAs 111, 112 are determined by the mobile device 130. FIG. 9B generally corresponds to FIG. 9A.

In the example of FIG. 9B, the channel estimators of each pipeline implement combination of a plurality of positioning reference signals 150 received from the respective BS 101, 102. For example, a value can be determined which is indicative of a plurality of positioning reference signals 150 based on a combination of at least some of the positioning reference signals 150 received in the respective sequence of subframes 202. E.g., the symbols of the various positioning reference signals 150 may be summed. Then, the respective TOA 111, 112 can be determined based on the value.

In the example of FIG. 9B, the UE performs least square (LS) channel estimation to obtain the coarse channel weight. The obtained channel weight can be filtered in time and/or frequency domain to obtain finer results (filter in FIG. 9B).

Such techniques relax memory requirements. This is because it is not required to store each received positioning reference signals 150. Rather, it is only required to store the combined value.

Such techniques further increase the signal-to-noise ration. This is because multiple positioning reference signals 150 are combined before determining the TOA. This facilitates coverage enhancement.

Figure 10:
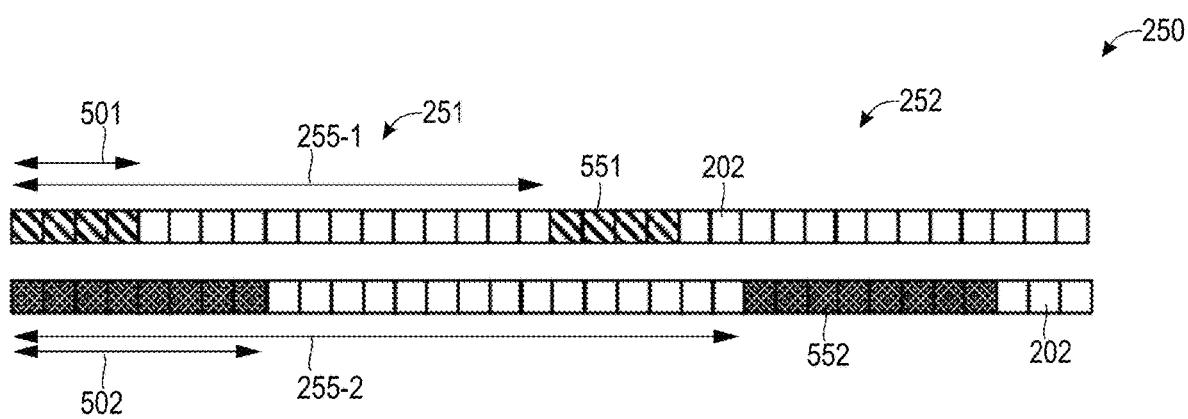
FIG. 10 schematically illustrates a sequence of subframes of the wireless channel comprising a plurality of resources allocated for transmission of DL positioning reference signals, wherein the sequences is repeated according to a timing schedule according to various embodiments.

FIG. 10 schematically illustrates aspects with respect to a repetitive timing schedule 250. The repetitive timing schedule 250 is used for transmission of DL positioning reference signals 551, 552 from a given BS 101-106 to the mobile device 130. Other BSs 101-106 may use the same or different repetitive timing schedule 250. FIG. 10 illustrates aspects with respect to multiple repetitive sequences 501, 502, each one of the multiple repetitive sequences 501, 502 comprising a plurality of subframes 202.

The repetitive sequence 501 includes subframes 202 including positioning reference signals 551. The repetitive sequence 502 includes subframes 202 including positioning reference signals 552. The positioning reference signals 551, as well as the positioning reference signals 552 both originate from one and the same given BS 101-106.

The positioning reference signals 551 facilitate determining the TOA of signals communicated between said given BS and the mobile device 130; likewise, the positioning reference signals 552 facilitate determining the TOA of signals communicated between said given BS and the mobile device 130. As such, both, the positioning reference signals 551, as well as the positioning reference signals 552 are conclusive in the sense that the TOA for the given BS can be determined solely based on the respective positioning reference signals 551, 552. Based on the TOA, the TDOA can be determined.

Generally, it is possible that the mobile device 130 is configured to receive, both, the positioning reference signals 551, as well as the positioning reference signals 552. In other examples, it is also possible that the mobile device 130 is configured to receive either the positioning reference signals 551 or the positioning reference signals 552. For example, the mobile device 130 can be configured to select between the repetitive sequence 501 and the repetitive sequence 502. Then, depending on said selecting, the mobile device 130 may selectively receive the positioning reference signals 551 in the sequence 501—or may rather receive the positioning reference signals 552 in the sequence 502. The TOA can then be determined selectively based on the positioning reference signals 551 or based on the positioning reference signals 552.

To distinguish between the positioning reference signals 551 and the positioning reference signals 552, TDM and/or FDM and/or CDM techniques may be employed. Here, for CDM techniques, scrambling code may be superimposed on sequence code which is used to encode the positioning reference signals 551, 552. The scrambling code may be specific for the positioning reference signals 551 or the positioning reference signals 552.

The positioning reference signals 552 can, in some examples, supplement the positioning reference signals 551. By supplementing the positioning reference signals 551 using the positioning reference signals 552, extended coverage can be provided. In particular, by supplementing the positioning reference signals 551 by the positioning reference signals 552, additional data based on which the positioning of the mobile device 130 can be implemented is provided. This increases the accuracy of determining the position of the mobile device 130.

In particular, it is possible to provide coverage for receiving positioning reference signals 151, 152 for MTC mobile devices operating in coverage enhanced mode, e.g., Mode B operation in eMTC. This is achieved by enabling the MTC mobile device to perform additional TOA measurements based on positioning reference signals 551, 552 transmitted by BSs 101-106 that are further away. Thereby, the available positioning data is increased such that the positioning accuracy may be improved.

In one example, the mobile device 130 can be configured to select between the sequences 501, 502 based on the receive power of signals communicated on the wireless channel 170. For example, the mobile device 130 can be configured to select between the sequences 501, 502 based on the receive power of the respective positioning reference signals 551, 552. In one example, if the receive power of the positioning reference signals 551 is below a threshold, the mobile device 130 can select the sequence 502 and thus receive the positioning reference signals 552. As illustrated in FIG. 10, the sequence 502 includes a larger count of subframes 202 if compared to the sequence 501. Therefore, in some examples, it is possible to receive a larger count of positioning reference signals 552 per repetition 251, 252 if compared to the count of positioning reference signals 551 per repetition 251, 252. This facilitates coverage enhancement.

It is, alternatively or additionally, possible that the mobile device 130 is configured to select between the sequence 501 of subframes 202 and the sequence 502 of subframes 202 based on the receive bandwidth of its interface 1302. For example, it is possible that the mobile device 130 implemented according to MTC requirements and/or according to NB-IOT requirements has an interface 1302 of limited complexity. In particular, it would be possible that the received bandwidth of the interface 1302 is limited if compared to legacy 3GPP LTE EUTRAN. For example, according to 3GPP NB-IoT, the system bandwidth and the bandwidth of the interface 1302 may be limited to a single resource block 212 and thus amount to 180 kHz. For example, according to 3GPP eMTC, the system bandwidth and the bandwidth of the interface 1302 may be limited to 6 resource blocks 212 and thus amounts 1.4 MHz. This facilitates reception of positioning reference signals 551, 552 having bandwidth 216 tailored to the receive bandwidth of the interface 1302.

In one example, the mobile device 130 can be configured to determine a value indicative of a combination of the received positioning reference signals 551, 552 and, then, determine the time of arrival based on said value. Then, the TOA can be determined based on said value (cf. FIG. 9B).

By such techniques of combining—e.g., summing up—of the received positioning reference signals 551, 552, the mobile device 130 can accumulate the energy of the received positioning reference signals 551, 552 throughout the respective sequence 501, 502 of subframes 202. Thereby, the quality—e.g., measured in terms of signal-to-noise ratio—of the received positioning reference signals 551, 552 can be increased. Thereby, coverage enhancement can be achieved.

To facilitate the coverage enhancement and interoperability with IOT applications, it is possible that the time-frequency density of the positioning reference signals 552 in the subframes 202 of the sequence 502 is larger than the time-frequency density of the positioning reference signals 551 in the subframes 202 of the sequence 501. It is, in particular, possible that the time-frequency density of the positioning reference signals 552 per resource block 212 is larger than the time-frequency density of the positioning reference signals 551 per resource block 212. It is, in particular, possible that the count of positioning reference signals 552 per resource block 212 is larger than the count of positioning reference signals 551 per resource block 212.

For example, different BSs may use different time-frequency densities of the positioning reference signals.

Generally, the count of positioning reference signals 551 in a subframe 202 of the sequence 501 may be different from the count of positioning reference signals 552 in a transmission frame 202 of the sequence 502. The count of positioning reference signals 551, 552 per subframe 202 may depend on the time-frequency density of the positioning reference signals 551, 552, the count of positioning reference signals 551, 552 per resource block 212, and the bandwidth 216. For example, it may be possible that the positioning reference signals 551 are transmitted in a frequency band that has a larger bandwidth 216 than the frequency band used for transmission of the positioning reference signals 552. I.e., different frequency bands 215 may be used for the transmission of the positioning reference signals 551, 552. For example, the bandwidth 216 of the frequency band used for transmission of the positioning reference signals 552 may be tailored for the needs of the reduced bandwidth eMTC or NB-IOT technologies.

As illustrated in FIG. 10, the repetition rate 255-2 of the sequence 502 may be smaller than the repetition rate 255-1 of the sequence 501. Such a scenario facilitates transmission of payload data by limiting the overhead due to a transmission of the positioning reference signals 552 in the subframes 202 of the sequence 502. In particular, in a scenario using protected subframes 202 for the transmission of the positioning reference signals 552, lowering the repetition rate 255-2 if compared to the repetition rate 255-1 may be advantageous in terms of overhead. At the same time, such a low repetition rate 255-2 may attribute for the finding that eMTC or NB-IoT devices at least in some scenarios may have a comparably low mobility. Then, a sampling frequency with which the location information for the respective mobile device 130 is determined can be comparably low; this, again, facilitates reduction of the repetition rate 255-2.

In the example of FIG. 10, the sequences 501, 502 are partially overlapping in time domain for the repetition 251. In other examples, it would be possible that the sequences 501, 502 do not overlap in time domain, i.e., are offset in time-domain for all repetitions 251, 252; thereby, TDM can be implemented in order to avoid interference between the transmission of the positioning reference signals 551 and the transmission of the positioning reference signals 552. TDM can also be implementing by superimposing the timing schedules 250 of the sequences 501, 502 with sequence-specific muting patterns. The muting patterns may be arranged such that the positioning reference signals 551, 552 are not simultaneously transmitted. Thereby, interference between the positioning reference signals 551, 552 is reduced.

In the example of FIG. 10, the length of the sequence 501 is shorter than the length of the sequence 502. This facilitates accumulation of sufficient positioning reference signals 552 per repetition 251, 252. This, again, facilitates coverage enhancement.

Figure 11:
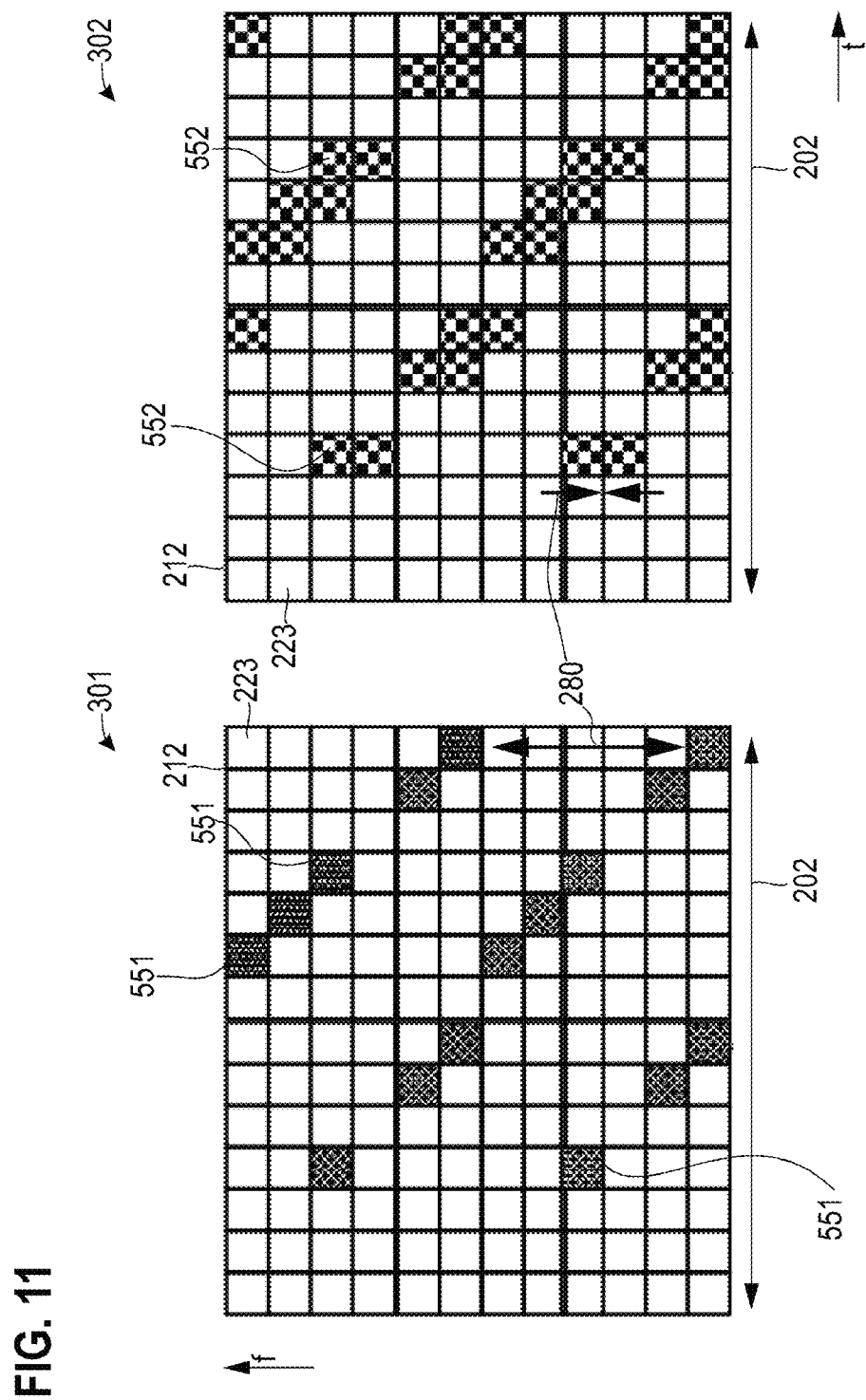
FIG. 11 schematically illustrates a resource mapping of a subframe of a wireless channel comprising a plurality of resources allocated for transmission of DL positioning reference signals according to various embodiments.

FIG. 11 illustrates a resource mapping 301 used for the transmission of the positioning reference signals 551 (left side of FIG. 11) and a resource mapping 302 used for the transmission of the positioning reference signals 552 (right side of FIG. 11). The positioning reference signals 551, as well as the positioning reference signals 552 are transmitted by a given BS 101-106 and received by the mobile device 130.

In FIG. 11, the resource mappings 301, 302 are illustrated for a given resource block 223. However, the resource mapping 301 and/or the resource mapping 302 may also cover further resource blocks (not illustrated in FIG. 11 for simplicity As illustrated in FIG. 11, the resource mappings 301, 302 used for the transmission of the positioning reference signals 551, 552, respectively, differ partially from each other. Hence, it is possible that the positioning reference signals 551 are allocated to at least partially different resources 223 in a given resource block 212 if compared to the positioning reference signals 552. TDM and FDM are facilitated. Interference between transmission of the positioning reference signals 551, 552 is mitigated.

In the example of FIG. 11, the resource mapping 302 of the positioning reference signals 552 implements a higher time-frequency density of the positioning reference signals 552 within the resource block 212 if compared to the resource mapping 301 of the positioning reference signals 551. In particular, in the example of FIG. 11, the time-frequency density of the positioning reference signals 552 is twice as large as the time-frequency density of the positioning reference signals 551.

Further, the frequency offset 280 between simultaneously transmitted positioning reference signals 551, 552 is decreased for the resource mapping 302 of the positioning reference signals 552 if compared to the resource mapping 301 of the positioning reference signals 551. In detail, for each resource 223 of the resource mapping 301 allocated for transmission of a positioning reference signal 551, the resource mapping 302 of the positioning reference signals 552 includes an additional resource 223 additionally allocated for transmission of a respective positioning reference signal 552. Two positioning reference signals 552 are allocated to resources 223 directly adjacent to each other in the resource mapping 302. For example, the resource mappings 301, 302 may be static. For example, a wrap around with respect to the boundaries of the resource block 212 may be applied. For example, in FIG. 11 an additional positioning reference signal 552 is aligned directly adjacent in frequency to the positioning references signals 551. For the positioning reference signal 551 in the fifth depicted OFDM symbol and the first subcarrier, there is no respective resource 223 available: wrap around with respect to the boundary of the resource block 212 can be applied an the additional positioning reference signal 552 is transmitted on the resource element of the fifth OFDM symbol and the twelfth subcarrier.

In the scenario of FIG. 11, due to the increased count of positioning reference signals 551, 552 per resource block 212 and/or per subframe 202, it is possible that the count of BSs 101-106 transmitting positioning reference signal in the same resource block 212 is limited. For example, according to reference implementations, the count of six BSs 101-106 could transmit positioning reference signals in the same resource block 212 (cf. FIG. 9A). For example, according to the example of FIG. 11, the count of BSs which transmit positioning reference signals in resource block 212 may be limited to three.

Such a reduced number of BSs transmitting positioning reference signals in the same resource block facilitates unique allocation the resource mappings 301, 302 to the given BS 101-106 transmitting the positioning reference signals 551, 552. Hence, other BSs 101-106 may use different resource mappings for the transmission of positioning reference signals during the resource block 212. This mitigates inter-cell interference.

In one example, it would be possible that the resources 223 of the resource mapping 301 allocated for transmission of the positioning reference signals 551 are varied as a function of repetitions 251, 252 of the sequence 501, e.g., in a cyclic manner. Alternatively or additionally, it would be possible that the resources 223 of the resource mapping 302 allocated for transmission of the positioning reference signals 552 are varied as a function of repetitions 251, 252 of the sequence 502, e.g., in a cyclic manner. Thereby, it may be possible to achieve additional redundancy and mitigate interference.

In the example of FIG. 11, some resources 223 are allocated for transmission of, both, the positioning reference signals 551, as well as for transmission of the positioning reference signals 552. To avoid interference, CDM can be employed. Then, the positioning reference signals 551 differ from the positioning reference signals 552. In other examples, it would also be possible that the positioning reference signals 551 of the shared resources implement the positioning reference signals 552. Then, the positioning reference signals 551 do not differ from the positioning reference signals 552.

Figure 12:
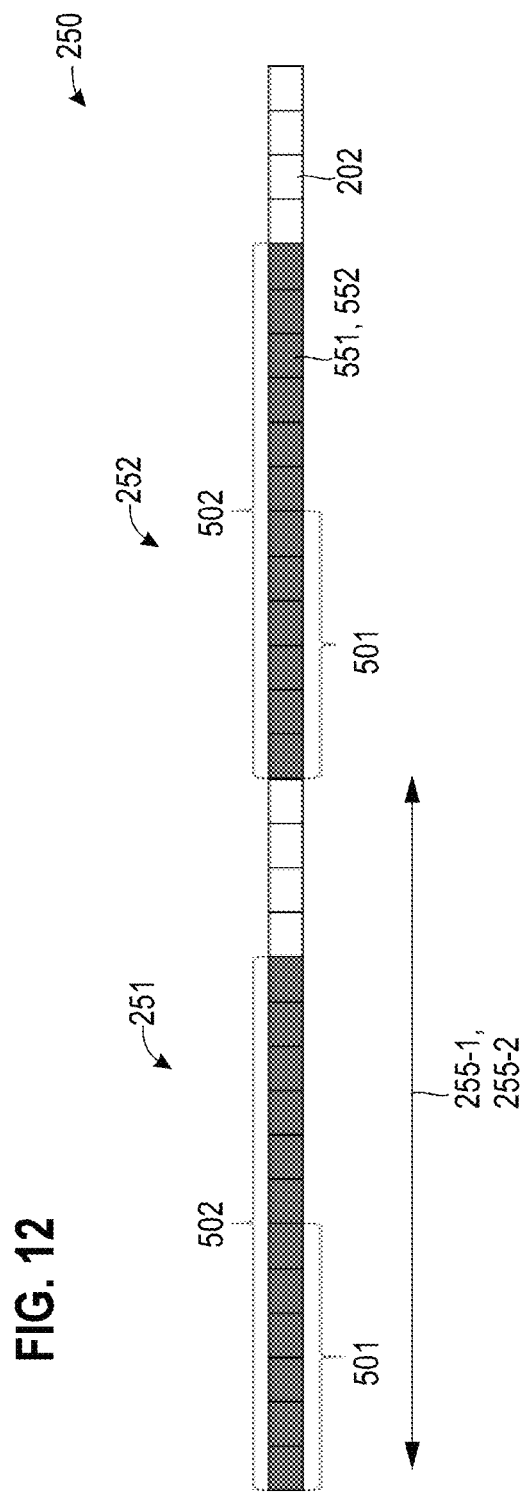
FIG. 12 schematically illustrates a sequence of subframes of the wireless channel comprising a plurality of resources allocated for transmission of DL positioning reference signals, wherein the sequences is repeated according to a timing schedule according to various embodiments.

FIG. 12 schematically illustrates aspects with respect to a repetitive timing schedule 250. The repetitive timing schedule 250 is used for transmission of DL positioning reference signals 551, 552 from a given BS 101-106 to the mobile device 130. Other BSs 101-106 may use the same or different repetitive timing schedule 250. FIG. 12 illustrates aspects with respect to multiple repetitive sequences 501, 502, each one of the multiple repetitive sequences 501, 502 comprising a plurality of subframes 202. FIG. 12 generally corresponds to FIG. 10. However, in the example of FIG. 12, the sequences 501, 502 are overlapping for each repetition 251, 252. As such, the subframes 202 of the sequence 501 form a subset of the subframes 202 of the sequence 502.

It is possible that the positioning reference signals 551 differ or do not differ from the positioning reference signals 552. In one example, it is possible that the positioning reference signals 151 are encoded based on the same sequence code as the positioning reference signals 152. The sequence code may have a dependency on the resource 223 used for transmission of the respective positioning reference signal 551, 552. In one example, it is possible the resource mapping 301 defines resources 223 for transmission of the positioning reference signals 551 which are also defined by the resource mapping 302 for transmission of the positioning reference signals 552 (cf. FIG. 11). Then, if the sequence code is shared, the respective positioning reference signals 551, 552 are the same. In such a scenario, the positioning reference signals 551 may form a subset of the positioning reference signals 552. Here, the positioning reference signal 551, 552 may be reused in the overlap region of the sequences 501, 502 for both the sequences 501, 502. This reduced overhead.

E.g., a mobile device 130 selecting the sequence 501 would stop receiving the positioning reference signals 551 at the end of a given repetition 251, 252 of the sequence 501. A mobile device 130 selecting the sequence 502 would continue receiving the positioning reference signals 552 beyond the end of the given repetition 251, 252 of the sequence 501 and until the end of the sequence 502: further positioning reference signals 552 can be accumulated.

Figure 13:
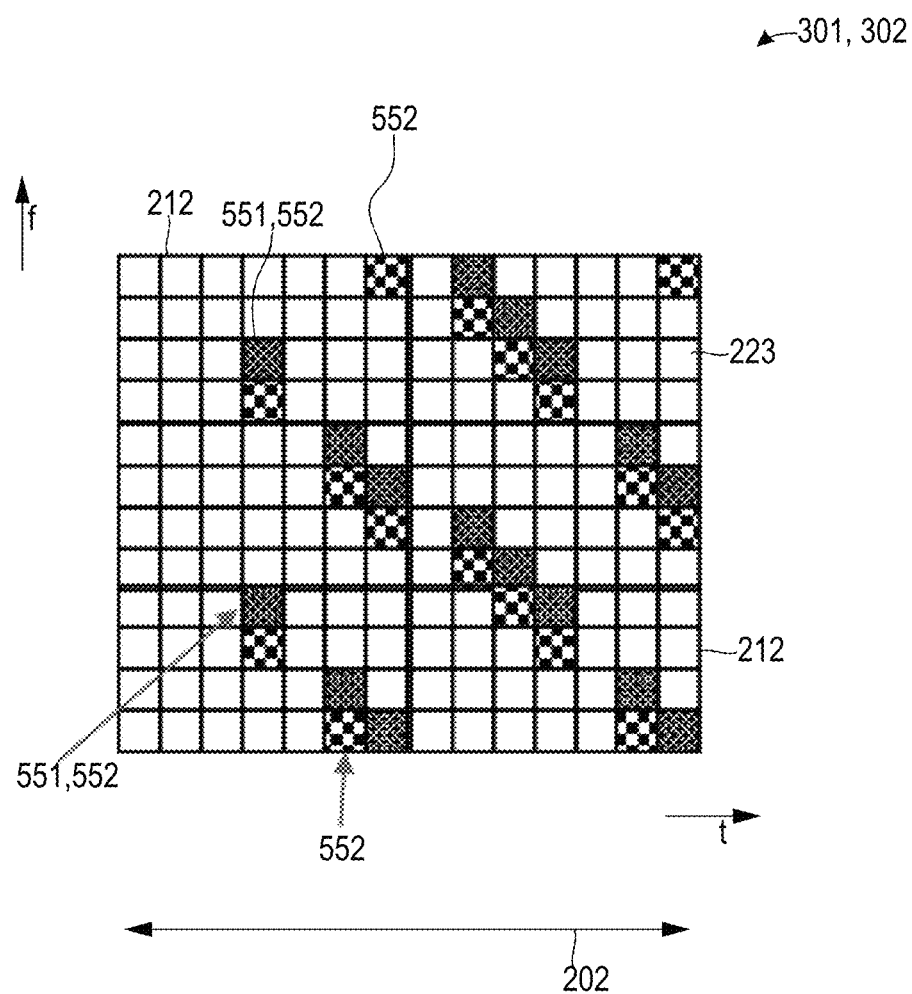
FIG. 13 schematically illustrates a resource mapping of a subframe of a wireless channel comprising a plurality of resources allocated for transmission of DL positioning reference signals according to various embodiments.

FIG. 13 illustrates aspects with respect to the resource mappings 301, 302 of the positioning reference signals 551, 552 associated with the sequences 501, 502. In particular, the resource mapping 301, 302 may be applied to a timing schedule 250 according to the example of FIG. 12.

In the example of FIG. 13, the positioning reference signals 551 form a subset of the positioning reference signals 552 within a given subframe 202. The resources 223 allocated for transmission of the positioning reference signals 551 are re-used for transmission of the positioning reference signals 552 as well. There are additional resources 223 solely allocated for transmission of the positioning reference signals 552.

Figure 14:
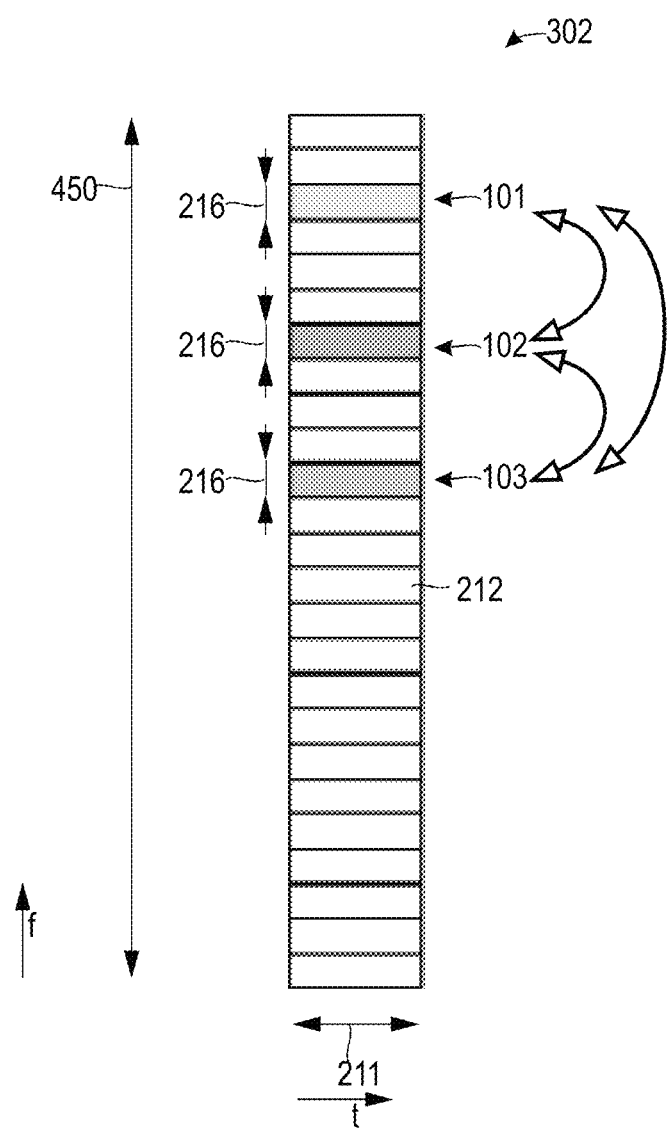
FIG. 14 schematically illustrates a resource mapping of a subframe of a wireless channel comprising a plurality of resources allocated for transmission of DL positioning reference signals according to various embodiments.

FIG. 14 illustrates aspects with respect to resource allocation for transmission of positioning reference signals 551, 552 by a plurality of BSs 101-103. In the example of FIG. 14, the frequency bandwidth 216 used for transmission of the positioning reference signals 552 by each one of the BSs 101-103 is smaller than the system bandwidth 450 of the wireless channel. Hence, the positioning reference signals occupy a subset of all available resource blocks 212 in the bandwidth 450 of the wireless channel. Because in some examples, the positioning reference signals are employed for positioning of MTC or NB-IoT mobile devices 130 which have interfaces 1302 operating at a smaller bandwidth, by restricting the bandwidth 216 accordingly, overhead can be reduced.

FIG. 14 illustrates examples with respect to transmission of positioning reference signals 551, 552 by a plurality of BSs 101-103. Various examples have been explained with respect to the positioning reference signals 551, 552 all originating from the given BS. Such concepts may be applied in various scenarios to multiple BSs 101-103 each transmitting positioning reference signals 551, 552 in at least partially different sequences 501, 502 of a repetitive timing schedule 250. Different BSs 101-103 may use at least partially different timing schedules 250 and/or least partially resource mappings 301, 302.

For sake of simplicity, hereinafter, various techniques are described exemplarily with respect to the positioning reference signals 552. However, such techniques may be readily applied to the positioning reference signals 551, alternatively or additionally.

Various scenarios to avoid inter-cell interference are conceivable. For example, it would be possible that the resource mappings 302 of the positioning reference signals 552 are arranged such that BSs 101-103 having an even cell ID occupy a certain set of resources 223 and BSs having an odd cell ID occupy a set of orthogonal resources 223. Here, one and the same resource blocks 212 can be shared among different BSs 101-103 (not shown in FIG. 14).

In a further example, orthogonality can be achieved by having the resource mappings 302 of BSs 101-103 having an even cell ID occupying different subframes 202 than BSs 101-103 having an odd cell ID (not shown in FIG. 14). For example, a muting pattern can be superimposed on the timing schedule 250 of the repetitions 251, 252 of the sequences 502 associated with the different BSs 101-102. The muting pattern can then be BS-specific, i.e., each BS 101-103 may have a muting pattern that is uniquely associated with the respective BS 101-103. This corresponds to a TDM approach of avoiding interference.

As illustrated in FIG. 14, in a further example, the frequency bands 216 used for transmission of the positioning reference signals 552 by different BSs 101-103 may be non-overlapping. For example, the resource block 212 that is used by a given BS 101-103 for transmission of the positioning reference signals 552 may be a function of the cell ID associated with the BS 101-103. A mobile device 130 can then tune in between the different frequency bands including the resource blocks 212 associated with a different BSs 101-103.

In general, such an approach can be extended beyond odd and even cell identities. In one example implementations, cell_ID mod x=0 occupies one set of resources and cell_ID mod X=1 occupies another set of resources, where cell_ID is the cell identity of a given BS.

Such concepts may be helpful where the time-frequency density of the positioning reference signals 552 is comparably high such that it, e.g., occupies all resources or a large fraction of all resources 223 of the given resource block 212 to improve coverage.

In the example of FIG. 14, frequency hopping may be employed for the frequency bands associated with the various BSs 101-103. For example, the particular resource blocks 212 associated with a given BS 101-103 may be altered as a function of the repetition 251, 252 of the respective sequence 502 of subframes 202 including the positioning reference signals 552. The frequency hop pattern may be configurable. Such techniques are described in the international patent application PCT/EP2016/067812 entitled "Frequency Hop Based Positioning Measurement" the respective disclosure of which is incorporated herein in its entirety by cross-reference.

The frequency hop pattern may implement a cyclic shift of the resource blocks 212 associated with the various BSs 101-103. This is indicated by the curved arrows in FIG. 14. Frequency hopping may provide resilience against frequency-select a fading. This may help to improve the accuracy of the positioning of the mobile device 130 by allowing measurements of the time of arrival to be performed across a wider effective bandwidth.

Beside concepts of avoiding inter-cell interference between multiple BSs 101-103 transmitting the positioning reference signals 552 which are based on FDM and/or TDM as explained above, alternatively or additionally, concepts of avoiding inter-cell interference based on CDM can be employed. For example, scrambling code can be considered in the sequence code for determining the positioning reference signals 552 transmitted by different BSs 101-103.

Figure 15:
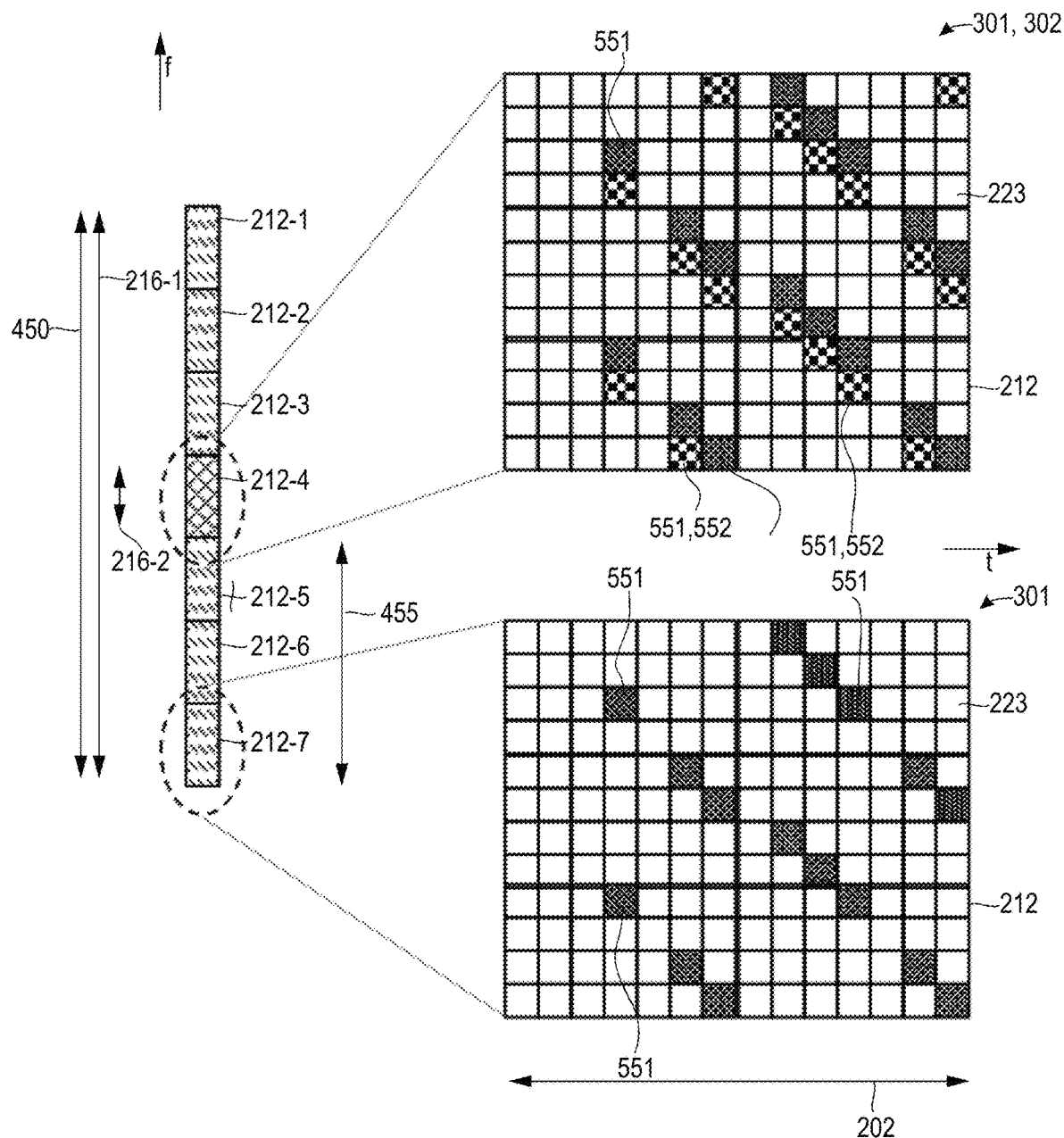
FIG. 15 schematically illustrates a resource mapping of a subframe of a wireless channel comprising a plurality of resources allocated for transmission of DL positioning reference signals according to various embodiments.

FIG. 15 illustrates aspects with respect to resource mappings 301, 302 employed for transmission of positioning reference signals 551, 552. The positioning reference signals 551, as well as the positioning reference signals 552 are transmitted by a given BS 101-106 and received by the mobile device 130.

Also in the scenario of FIG. 15, the resource mapping 302 of the positioning reference signals 552 occupies a comparably small bandwidth 216-2 if compared to the system bandwidth 450 of the wireless channel 170. The bandwidth 216-1 of the resource mapping 301 of the positioning reference signals 551 occupies the entire system bandwidth 450. Therefore, the bandwidth 216-1 is larger than the bandwidth 216-2.

As illustrated in FIG. 15, the frequency band used for transmission of the positioning reference signals 552 is centered within the frequency band used for transmission of the positioning reference signals 551. I.e., the center frequency of the frequency band used for transmission of the positioning reference signals 552 corresponds to the center frequency of the frequency band used for transmission of the positioning reference signals 551.

For example, for a system bandwidth 450 amounting to 10 MHz, it is possible that the bandwidth 216-1 equals 10 MHz while the bandwidth 216-2 is restricted to 1.4 MHz. Here, to enable a mobile device 130 to use, both, the positioning reference signals 551, as well as the positioning reference signals 552 for positioning purposes, typically, the starting resource block 212 of the positioning reference signals 551 is signaled to the mobile device 130. The starting resource block 212 is required in order to determine the signal sequence applied to the positioning reference signals 551. For example, it is possible that the terminal is signaled the offset 455 relative to the first resource block 212 of the positioning reference signals 552 of the starting resource block 212 of the positioning reference signals 551.

The sequence code used for the positioning reference signals 551 in a given resource block 212 may be a function of the particular resource block 212 to which the positioning reference signal 551 is applied. Alternatively or additionally, the sequence code used for a given positioning reference signal 551 can be a function of the difference between the start resource block 212 PRB_y of the positioning reference signals 551 and the resource block 212 PRB_x of the given positioning reference signal 551, i.e., the code of the given positioning reference signals 551 in the resource block 212 PRB_x may be a function of y-x.

Similar consideration also may apply to the positioning reference signals 552 and the respective sequence code.

Figure 16:
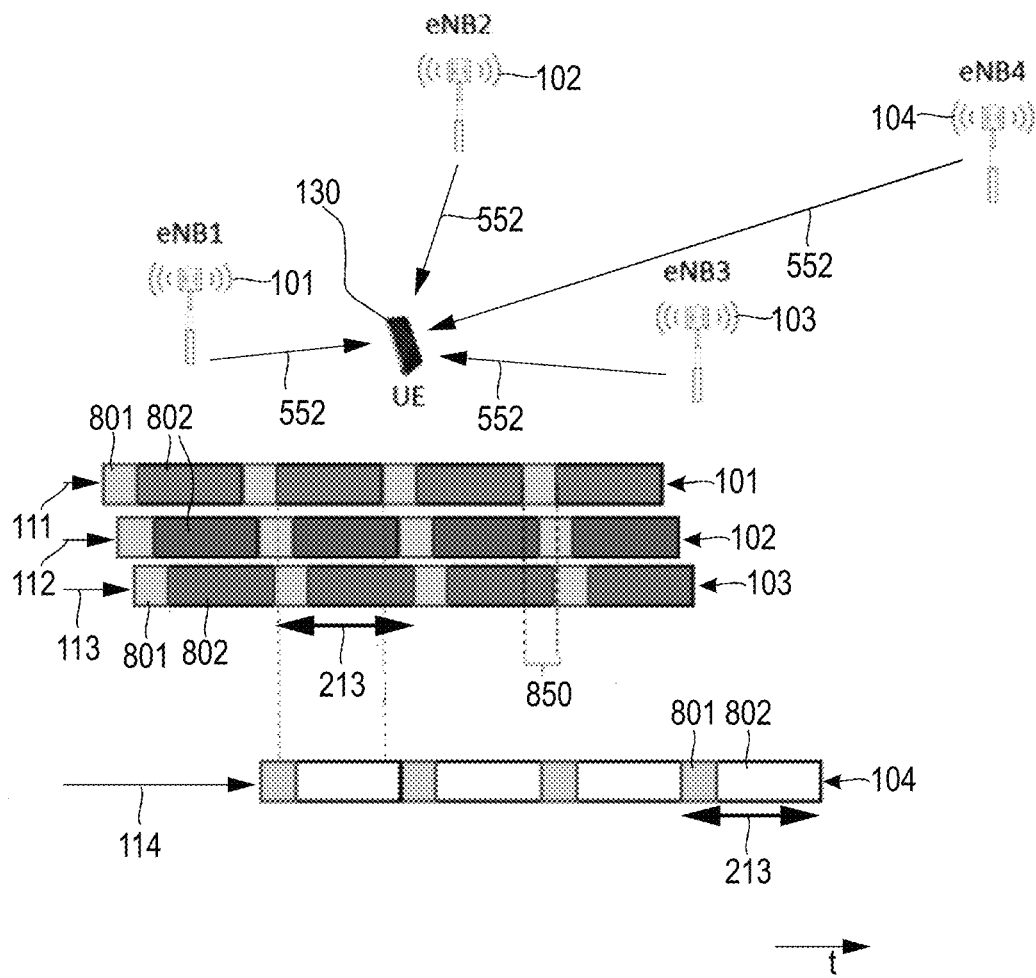
FIG. 16 schematically illustrates a time-difference of arrival between transmission and reception.

FIG. 16 illustrates aspects with respect to the TDOA 850 between reception of positioning reference signals 552 transmitted by different BSs 101-104. In FIG. 16, multiple resources 223 are illustrated for each BS 101-104: each resource 223 includes a cyclic prefix 801 and an OFDM symbol 802.

In the example of FIG. 16, transmission by the BSs 101-104 is time synchronized. I.e., the beginning of an new resource 223 is time-synchronized between the BSs 101-104. The BSs 101-104 all have different distances from the mobile device 130. Hence, the TOAs 111-114 of the respective positioning reference signals 552 are all different for the various BS 101-104.

FIG. 16 also illustrates the TDOA 850 between the TOAs 111, 113. In the legacy scenarios, typically, the TDOA 850 is limited, because positioning reference signals are not received from BSs 101-104 located at a large distance with respect to the terminal 130. However, as has been explained above, according to various example techniques described herein, it is possible to implement coverage enhancement. Because of this, it is possible to receive the positioning reference signals 552 from the BS 104. The distance between the mobile device 130 and the BS 104 is so large that the respective TDOA is longer than the duration of the cyclic prefix 801.

Because the TDOA may be longer than the duration of the cyclic prefix 801, ambiguities in determining the TDOA may result. Hence, it is possible that the positioning reference signals 552 are indicative of the respective subframe 202. This may be done by using sequence code which shows a dependency on the sequence number of the respective subframe 202. For example, such a dependency of the sequence code on the sequence number of the respective transmission frame 202 may be employed using scrambling code. For example, the positioning reference signals 552 may be indicative of the boundary of the respective transmission frame 202, e.g., the last OFDM symbols adjacent to the next subframe 202. By being able to associate the received positioning reference signal 552 with a given subframe 202, it is possible to resolve ambiguities.

Such techniques as explained with respect to the positioning reference signals 552 above may be applied, alternatively or additionally, to the positioning reference signals 551.

Figure 17:
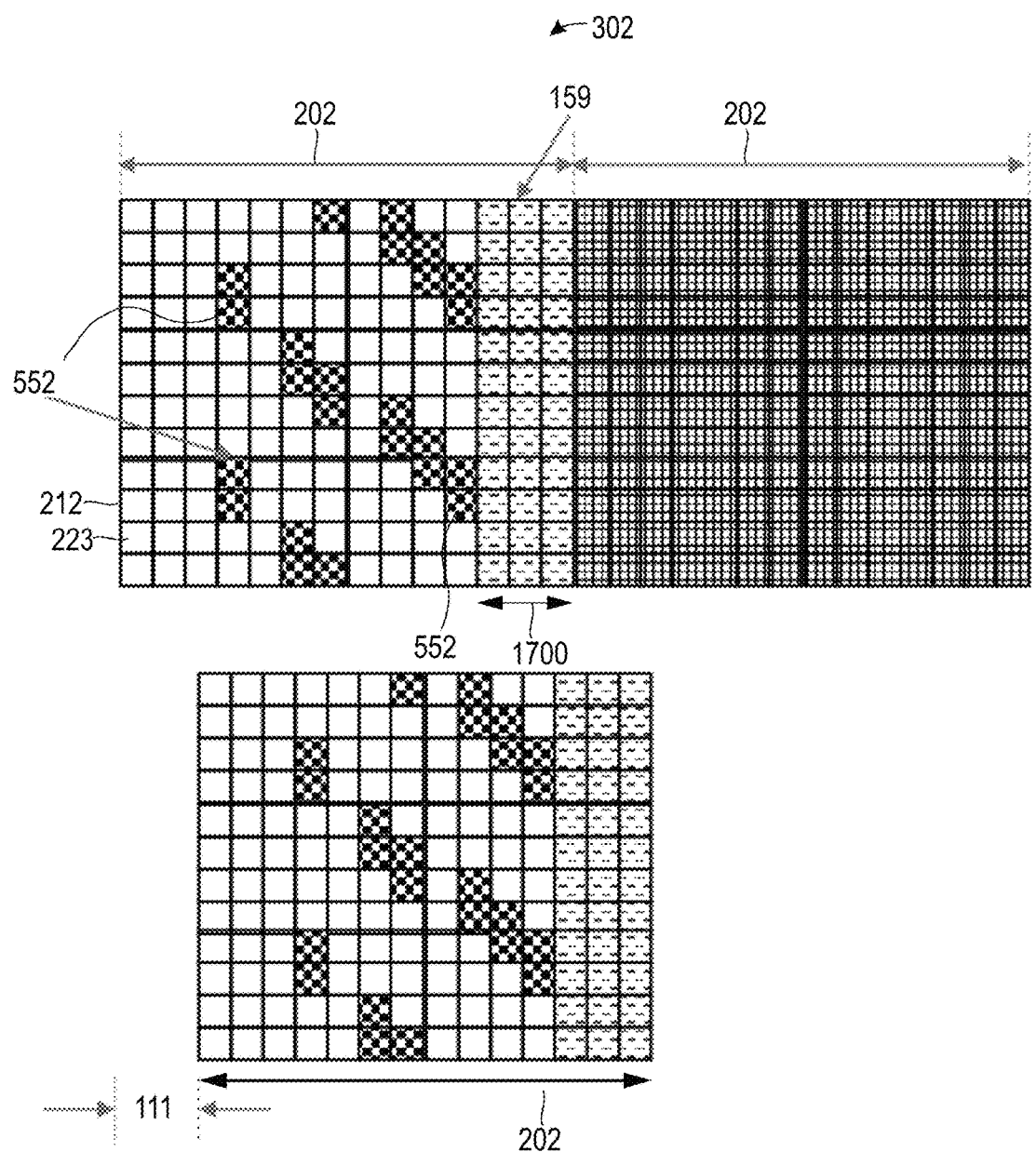
FIG. 17 schematically illustrates a resource mapping of a subframe of a wireless channel comprising a plurality of resources allocated for transmission of DL positioning reference signals according to various embodiments.

FIG. 17 illustrates aspects with respect to the resource mapping 302 including resources 223 allocated for transmission of the positioning reference signals 552. In the example of FIG. 17, a subframe 202 includes the positioning reference signals 552. However, the positioning reference signals 552 do not occupy the last three resources/symbols 223 of the subframe 202. The last 3 resources/symbols 223 in the example of FIG. 17 implement a safety margin. In particular, as illustrated in FIG. 17, lower part, the TOA 111 between transmission and reception can be longer than the cyclic prefix 801. To avoid corruption of the following subframe 202 (illustrated in FIG. 17, upper part, right side), the safety margin 1700 can be employed. While in the example of FIG. 17 the safety margin 1700 has a duration of three OFDM symbols 223, in other examples, the safety margin 1700 may have a longer or shorter duration.

Various examples as explained above with respect to FIGS. 16 and 17 with respect to the positioning reference signals 552 may be readily applied to the positioning reference signals 551, alternatively or additionally.

Figure 18:
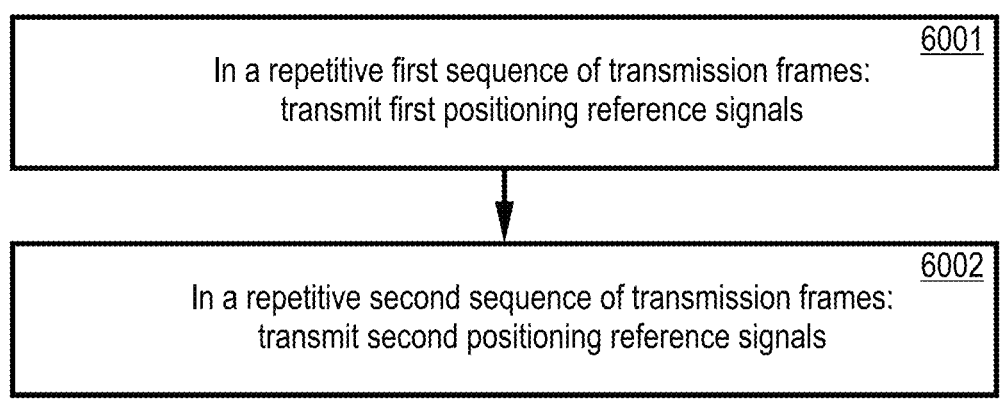
FIG. 18 is a flowchart of a method according to various embodiments.

FIG. 18 is a flowchart of a method according to various examples. At block 6001, first positioning reference signals are transmitted, e.g., by a base station. The first positioning reference signals are transmitted according to a repetitive timing schedule. The timing schedule defines a repetitive first sequence of transmission frames. The transmission frames of the first sequence include the first positioning reference signals.

At block 6002, second positioning reference signals are transmitted, e.g., by the same base station which transmits the first positioning reference signals in block 6001. The second positioning reference signals are transmitted according to a further repetitive timing schedule. The further repetitive timing schedule defines a repetitive second sequence of transmission frames. The transmission frames of the second sequence include the second positioning reference signals.

It is then possible to determine the TOA based on the received first positioning reference signals and/or based on the received second positioning reference signals.

Figure 19:
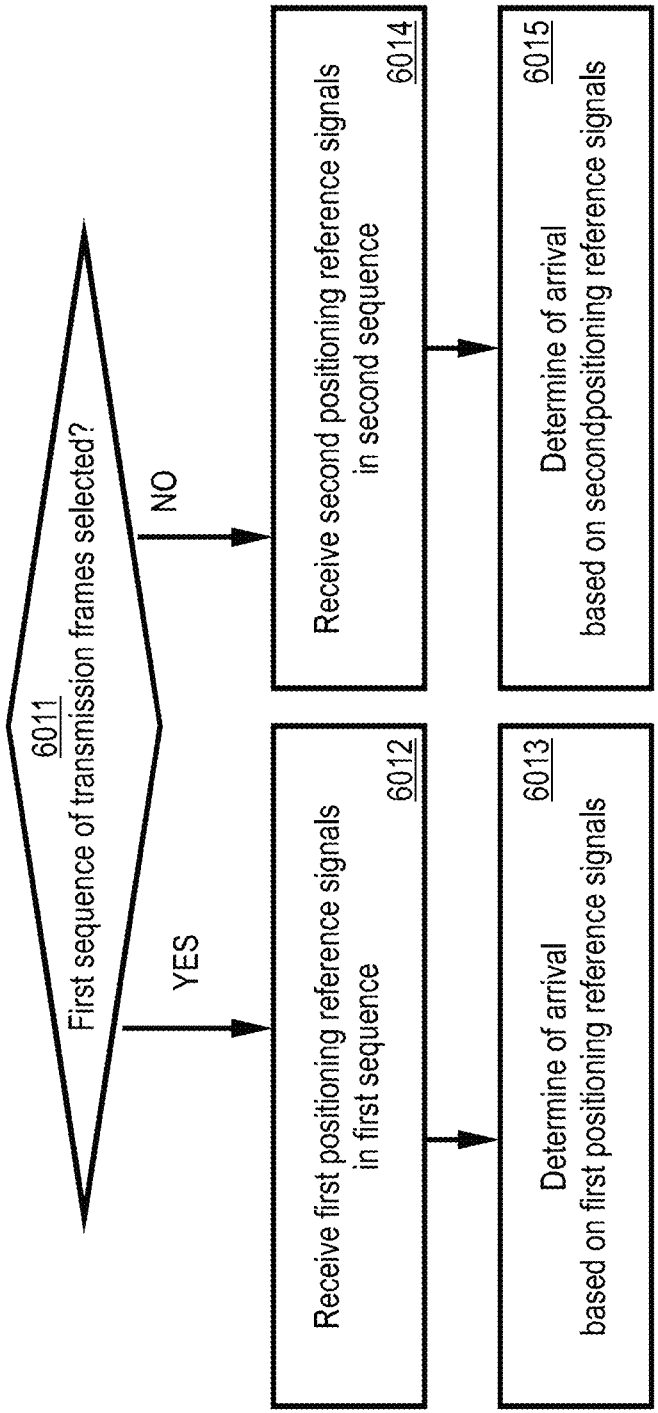
FIG. 19 is a flowchart of a method according to various embodiments.

FIG. 19 is a flowchart of a method according to various examples. At block 6011, selection between a repetitive first sequence of transmission frames and repetitive second sequence of transmission frames is made. Generally, selection can be made between more than 2 sequences of transmission frames.

If at block 6011 the first sequence is selected, the method commences at block 6012. At block 6012, first positioning reference signals are received in the first sequence. Then, at block 6013, the TOA can be determined based on the first positioning reference signals received at block 6012.

If at block 6011 and the second sequence is selected, the method commences at block 6014. At block 6014, second positioning reference signals are received in the second sequence. Then, at block 6015, the TOA can be determined based on the second positioning reference signals received at block 6014.

FIG. 20 is a flowchart of a method according to various examples. At block 6021, at least one control message is communicated to a base station. Alternatively or additionally, the at least one control message may be communicated to one or more mobile devices. The control message is indicative of a repetitive first sequence of transmission frames and a repetitive second sequence of transmission frames. The base station is to transmit first positioning reference signals in the first sequence and second positioning reference signals and the second sequence.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A base station, comprising:
an interface configured to communicate on a wireless channel, and
at least one processor configured
to transmit, in a repetitive first sequence of transmission frames of the wireless channel, first positioning reference signals and
to transmit, in a repetitive second sequence of transmission frames of the wireless channel which is at least partly different from the first sequence, second positioning reference signals,
wherein the first positioning reference signals and the second positioning reference signals each facilitate determining a time of arrival of signals communicated on the wireless channel, and
wherein a count of the first positioning reference signals in the transmission frames of the first sequence is different from a count of the second positioning reference signals in the transmission frames of the second sequence.

2. The base station of claim 1,
wherein the count of the first positioning reference signals per subframe of the transmission frames of the first sequence is different from the count of the second positioning reference signals per subframe of the transmission frames of the second sequence.

3. The base station of claim 1,
wherein the count of the first positioning reference signals per resource block of the transmission frames of the first sequence is different from the count of the second positioning reference signals per resource block of the transmission frames of the second sequence.

4. The base station of claim 1,
wherein the first positioning reference signals are encoded based on a first sequence code,
wherein the second positioning reference signals are encoded based on a second sequence code, and
wherein the first sequence code and the second sequence code are the same.

5. The base station of claim 1,
wherein the first positioning reference signals are indicative of a respective transmission frame, and/or
wherein the second positioning reference signals are indicative of a respective transmission frame.

6. The base station of claim 1,
wherein the first positioning reference signals do not occupy at least the last resource of each one of the respective transmission frames, preferably at least the last two resources, more preferably at least the last three resources, and/or
wherein the second positioning reference signals do not occupy at least the last resource of each one of the respective transmission frames, preferably at least the last two resources, more preferably at least the last three resources.

7. The base station of claim 1,
wherein the time-frequency density of the first positioning reference signals in the transmission frames of the first sequence is different from the time-frequency density of the second positioning reference signals in the transmission frames of the second sequence.

8. The base station of claim 1,
wherein the frequency band of the first positioning reference signals is different from the frequency band of the second positioning reference signals.

9. The base station of claim 1,
wherein a repetition rate of the first sequence is different from a repetition rate of the second sequence.

10. The base station of claim 1,
wherein the first sequence and the second sequence are at least partially overlapping in time.

11. The base station of claim 1,
wherein the length of the first sequence is longer than the length of the second sequence.

12. The base station of claim 1,
wherein the first sequence is associated with a first resource mapping of orthogonal time-frequency resources,
wherein the second sequence is associated with a second resource mapping of orthogonal time-frequency resources,
wherein the first resource mapping and the second resource mapping are at least partially different from each other.

13. The base station of claim 12,
wherein the first resource mapping and/or the second resource mapping are uniquely allocated to the base station.

14. The base station of claim 12,
wherein the resources of the first resource mapping allocated for transmission of the first positioning reference signals are varied as a function of repetitions of the first sequence, and/or
wherein the resources of the second resource mapping allocated for transmission of the second positioning reference signals are varied as a function of repetitions of the second sequence.

15. A device, comprising:
an interface configured to communicate on a wireless channel, and
at least one processor configured
to select between a repetitive first sequence of transmission frames of the wireless channel and a repetitive second sequence of transmission frames of the wireless channel prior to receiving the first or second sequence of transmission frames,
to selectively receive, based on said selecting, one of:
first positioning reference signals in the first sequence; or
second positioning reference signals in the second sequence, and
to determine a time of arrival of signals communicated on the wireless channel selectively based on the first positioning reference signals or the second positioning reference signals depending on said selecting.

16. The device of claim 15,
wherein the device is configured to select between the first sequence and the second sequence based on at least one of a receive power of signals communicated on the wireless channel and a receive bandwidth of the interface.

17. The device of claim 15,
wherein the device is configured to determine at least one first value indicative of the first positioning reference signals based on a combination of at least some of the first positioning reference signals and to determine the time of arrival based on the at least one first value, and/or
wherein the device is configured to determine at least one second value indicative of the second positioning reference signals based on a combination of at least some of the second positioning reference signals and to determine the time of arrival based on the at least one second value.

18. A network node, comprising:
an interface configured to communicate with at least one of a plurality of base stations and a device,
at least one processor configured to communicate at least one control message to at least one of a given one of the plurality of base stations and the device, the at least one control message being indicative of a repetitive first sequence of transmission frames of a wireless channel, in which the given base station is to transmit first positioning reference signals to a device and further indicative of a repetitive second sequence of transmission frames of the wireless channel, in which the given base station is to transmit second positioning reference signals to the device,
wherein the first positioning reference signals and the second positioning reference signals each facilitate determining of a time of arrival of signals communicated on the wireless channel, and wherein a count of the first positioning reference signals in the transmission frames of the first sequence is different from a count of the second positioning reference signals in the transmission frames of the second sequence.

* * * * *